US012367867B2

(12) United States Patent
Spall et al.

(10) Patent No.: US 12,367,867 B2
(45) Date of Patent: Jul. 22, 2025

(54) SYSTEM FOR GENERATING VOICE IN AN ONGOING CALL SESSION BASED ON ARTIFICIAL INTELLIGENT TECHNIQUES

(71) Applicant: SAMSUNG ELECTRONICS CO., LTD., Suwon-si (KR)

(72) Inventors: Sandeep Singh Spall, Moga (IN); Tarun Gupta, Noida (IN); Narang Lucky Manoharlal, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 278 days.

(21) Appl. No.: 17/973,266

(22) Filed: Oct. 25, 2022

(65) Prior Publication Data
US 2023/0130777 A1 Apr. 27, 2023

(30) Foreign Application Priority Data

Oct. 26, 2021 (IN) .............................. 202111048934

(51) Int. Cl.
*G10L 15/16* (2006.01)
*G10L 15/02* (2006.01)

(52) U.S. Cl.
CPC ........ *G10L 15/16* (2013.01); *G10L 2015/025* (2013.01)

(58) Field of Classification Search
CPC .......................... G10L 15/16; G10L 2015/025
See application file for complete search history.

(56) References Cited

U.S. PATENT DOCUMENTS

| 10,965,806 B1 | 3/2021 | Haggerty | |
|---|---|---|---|
| 2005/0027531 A1* | 2/2005 | Gleason | G10L 13/06 704/260 |
| 2006/0129401 A1* | 6/2006 | Smith | G10L 13/06 704/260 |
| 2015/0058005 A1* | 2/2015 | Khare | G10L 15/063 704/235 |
| 2018/0315420 A1* | 11/2018 | Ash | G10L 15/193 |

(Continued)

FOREIGN PATENT DOCUMENTS

| CN | 111292768 A | 6/2020 |
|---|---|---|
| CN | 113053400 A | 6/2021 |

(Continued)

OTHER PUBLICATIONS

Rochan, Mrigank, Linwei Ye, and Yang Wang. "Video summarization using fully convolutional sequence networks." Proceedings of the European conference on computer vision (ECCV). 2018. (Year: 2018).*

(Continued)

*Primary Examiner* — Brian L Albertalli
(74) *Attorney, Agent, or Firm* — Sughrue Mion, PLLC

(57) ABSTRACT

A method for generating voice in an ongoing call session based on artificial intelligent techniques is provided. The method includes extracting a plurality of features from a voice input through an artificial neural network (ANN); identifying one or more lost audio frames within the voice input; predicting by the ANN, for each of the one or more lost audio frames, one or more features of the respective lost audio frame; and superposing the predicted features upon the voice input to generate an updated voice input.

14 Claims, 24 Drawing Sheets

(56) References Cited

U.S. PATENT DOCUMENTS

| | | | |
|---|---|---|---|
| 2019/0348021 A1* | 11/2019 | Trim | G06F 18/23 |
| 2020/0175987 A1 | 6/2020 | Thomson et al. | |
| 2022/0165280 A1 | 5/2022 | Liang | |
| 2023/0206902 A1* | 6/2023 | Guo | G10L 15/01 |
| | | | 704/231 |

FOREIGN PATENT DOCUMENTS

| | | |
|---|---|---|
| KR | 10-2014-0013606 A | 2/2014 |
| WO | 2018/048934 A1 | 3/2018 |

OTHER PUBLICATIONS

Dubey, Shiv Ram, Satish Kumar Singh, and Bidyut Baran Chaudhuri. "A comprehensive survey and performance analysis of activation functions in deep learning." arXiv preprint arXiv:2109.14545 99 (2021). (Year: 2021).*

Pascual, Santiago, Joan Serrá, and Jordi Pons. "Adversarial auto-encoding for packet loss concealment." 2021 IEEE Workshop on Applications of Signal Processing to Audio and Acoustics (WASPAA). IEEE, 2021. (Year: 2021).*

Patel, Maitreya, et al. "Novel Inception-GAN for Whisper-to-Normal speech conversion." Proceedings of 10th ISCA Speech Synthesis Workshop (SSW 10), Vienna, Austria. 2019. (Year: 2019).*

Rochan, Mrigank, and Yang Wang. "Video summarization by learning from unpaired data." Proceedings of the IEEE/CVF conference on computer vision and pattern recognition. 2019. (Year: 2019).*

Stimberg, Florian, et al. "WaveNetEQ—Packet loss concealment with WaveRNN." 2020 54th Asilomar Conference on Signals, Systems, and Computers. IEEE, 2020. (Year: 2020).*

Munmi Dutta et al., "Closed-Set Text-Independent Speaker Identification System Using Multiple ANN Classifiers", Proceedings of the 3rd International Conference on Frontiers of Intelligent Computing: Theory and Applications (FICTA) 2014, vol. 327, Nov. 2014, pp. 377-385, DOI: 10.1007/978-3-319-11933-5_41.

Communication issued on Apr. 1, 2024 by the Intellectual Property India for Indian Patent Application No. 202111048934.

Harold, "Google Duo Has No Sound, Can't Hear Other Callers", The Droid Guy, May 2020, https://thedroidguy.com/google-duo-has-no-sound-1130598, 17 pages total.

"How do I fix sound or video call problems on Google Duo?", Google Duo Help, Oct. 2017, https://googleduohelp.com/question/how-do-i-fix-sound-or-video-call-problems-on-google-duo/, 2 pages total.

"How to improve the quality of your Microsoft Teams calls", HR future, Jul. 2020, https://www.hrfuture.net/future-of-work/trending/how-to-improve-the-quality-of-your-microsoft-teams-calls, 5 pages total.

Mitul Patel, "How to improve WhatsApp call quality for voice calling feature", KADVACORP, Oct. 2018, https://www.kadvacorp.com/technology/improve-whatsapp-call-quality-voice-calling, 4 pages total.

"Why am I experiencing issues with WhatsApp Calling?", WhatsApp Web, Jan. 2021, https://faq.whatsapp.com/general/why-am-i-experiencing-issues-with-whatsapp-calling, 2 pages total.

Elena Malykhina, "Why Is Cell Phone Call Quality So Terrible?", Scientific American, Springer Nature, Apr. 2015, https://www.scientificamerican.com/article/why-is-cell-phone-call-quality-so-terrible/, 3 pages total.

* cited by examiner

Summary discriminator network, $S_D$

SYSTEM FOR GENERATING VOICE IN AN ONGOING CALL SESSION BASED ON ARTIFICIAL INTELLIGENT TECHNIQUES

CROSS-REFERENCE TO RELATED APPLICATION(S)

This application is based on and claims priority under 35 U.S.C. § 119 (e) to Indian Patent Application number 202111048934, filed on Oct. 26, 2021, in the Indian Patent Office, the disclosure of which is incorporated by reference herein in its entirety.

BACKGROUND

1. Field

The disclosure relates to communication systems, in particular, to voice based calling systems.

2. Description of Related Art

Related art Internet based voice-calling systems usually undergo negative impact upon conversation due to low-quality voice. The same may take place due to inadvertent speaking, slow speaking, fast speaking, baby-talk etc. Accordingly, the captured audio packet or quality is not up to expectation and the same leads to a quality-compromised audio communication or voice-call for the receiver.

Other type of low quality voice emanating from the user may be degraded voice due to biological or physical issues of a speaker, such as vocal related diseases, aging, screaming, thyroid problems, use, smoking, throat dehydration, voice misuse or overuse etc. In another scenario, during voice call if a speaker speaks slowly or whispers, the user at other end cannot hear what has been spoken by speaker. In an example, late-night conversations are further problematic when the user also tries to maintain silence or avoid disturbance to others. In yet another scenario, types of degraded voice may be observed from personal-talk on public places such as office, bank, train etc, where unintentional use of speaker-phone leads to loss of sensitive and personal information.

Various types of related art mechanisms usually recommend an optimum internet connective for call-quality and ease of communication. To augment voice quality, there may be some application-specific features such as improving audio quality with machine learning by targeting the missing packets and packets in the wrong order for auto-completion.

Other related art options include static tools to monitor, troubleshoot, manage, and improve call quality. For example, a call quality dashboard may be provided to analyses trends or problems, call analytics may be provided to analyze call and meeting quality for individual users and Quality of Service (QOS) may be provided to prioritize important network traffic.

In yet another scenario, the spoken voice may not degraded, but may include use of foul language during phone call by the caller or receiver. There may be also a scenario in which, a listener is not listening properly during call or not paying attention on phone-call knowingly or unknowingly due to distractions.

There is at least a need to adjust user's audio/voice during the conversation at listener end using smartphones and thereby prevent improper or unwanted generation of voice/audio at receiving end to the listener.

There is at least a need to enhance communication quality even when there is no packet loss.

There is at a least a need to detect problem with an audio stream/packet/waveform and remedy the detected problem.

SUMMARY

Provided is a method for enabling the user's audio/voice adjustment during the conversation at listener end using smartphones. An AI model (for example in a mobile device) detects vocal issues such as speech deterioration, voice less sound, voice breaking or tremoring, whispering as would have occurred due to change in pace/style of speaking.

Further, provided is a method for enabling the quality of voiceless verbal syllables and words by reinforcing the existing packets for generating the missing packets based on the vicinity. Thereafter, communication quality is enhanced using the audio remediation even when there is no packet loss.

Further, provided is a method for detecting problems with an audio stream/packet/waveform and modifying or generating the waveform for detected issue using to remedy the detected problem. In an example, the detected problem may be audio/voice packet drop during conversation due to incorrect speaking, noise packet deterioration etc.

According to an aspect of the disclosure, there is provided a method of generating voice in a call session, the method including: extracting a plurality of features from a voice input through an artificial neural network (ANN); identifying one or more lost audio frames within the voice input; predicting by the ANN, for each of the one or more lost audio frames, one or more features of the respective lost audio frame; and superposing the predicted features upon the voice input to generate an updated voice input.

The predicting by the ANN may include: operating a single-layer recurrent neural network for audio generation configured to predict raw audio samples.

The single-layer recurrent neural network includes an architecture defined by WaveRNN and a dual softmax layer.

The method may further include correcting the updated voice input by: receiving the updated voice input and obtaining a confidence score of the updated voice input; splitting the updated voice input into a plurality of phonemes based on the confidence score; and identifying one or more non-aligned phonemes out of the plurality of phonemes based on comparing the plurality of phonemes with language vocabulary knowledge.

The method may further include: generating a plurality of variant phonemes; and updating the identified one or more non-aligned phonemes through one or more of: replacing the identified one or more non-aligned phonemes with the plurality of variant phonemes; adding additional phonemes to supplement the identified one or more non-aligned phonemes; or deleting the identified one or more non-aligned phonemes; or regenerating the updated voice input defined by one or more of: replacement of the identified one or more non-aligned phonemes with the variant phonemes; removal of the identified one or more non-aligned phonemes; or additional phonemes supplementing the identified one or more non-aligned phonemes.

The method may further include converting the updated voice input defined by a whisper into a converted updated voice input defined by a normal voice-input based on: executing a time-alignment between whispered and a corresponding normal speech; and learning by a generator adversarial network (GAN) model cross-domain relations between the whisper and the normal speech.

The method may further include improving voice quality of the updated voice input based on a nonlinear activation function.

According to an aspect of the disclosure, there is provided a method of summarizing voice communication in a call session based, the method including: extracting one or more frames from an input audio; encoding a temporal-information associated with the one or more frames through a convolution network; executing a deconvolution over the encoded information to obtain a prediction score; classifying the extracted frames into key frames or non-key frames based on the prediction score; and presenting a summary based on the classified key frames.

The presenting the summary may include: learning relation between raw audio frames (A) and a set of summary audios (S), wherein a distribution of resultant summary-audios F(A) is targeted to be similar to a distribution of the set of summary audios (S); and training a summary discriminator to differentiate between the generated summary audio F(A) and a real summary audio.

The extracting the one or more frames from the input audio may include extracting the one or more frames from an updated voice input generated by: extracting a plurality of features from a voice input through an artificial neural network (ANN); identifying one or more lost audio frames within the voice input from the voice input through the ANN; predicting by the ANN, for each of the one or more lost audio frames, one or more features of the respective lost audio frame; and superposing the predicted features upon the voice input to generate the updated voice input.

According to an aspect of the disclosure, there is provided a system for generating voice in a call session, the system including: a microphone; a memory storing one or more instructions; and a processor configured to execute the one or more instructions to: extract a plurality of features from a voice input through an artificial neural network (ANN); identify one or more lost audio frames within the voice input; predict by the ANN the features of the lost frame for each missing frame; and superpose the predicted features upon the voice input to generate an updated voice input.

The processor may be further configured to execute the one or more instructions to by the ANN by operating a single-layer recurrent neural network for audio generation configured to predict raw audio samples.

The single-layer recurrent neural network may include an architecture defined by WaveRNN and a dual softmax layer.

The processor may be further configured to execute the one or more instructions to correct the updated voice input by: receiving the updated voice input and obtaining a confidence score of the updated voice input; splitting the updated voice input into a plurality of phonemes based on the confidence score; and identifying one or more non-aligned phonemes out of the plurality of phonemes based on comparing the plurality of phonemes with language vocabulary knowledge.

The processor may be further configured to: extract one or more frames from an input audio; encode a temporal information associated with the one or more frames through a convolution network; execute a deconvolution over the encoded information to obtain a prediction score; classify the extracted frames into key frames or non-key frames based on the prediction score; and present a summary based on the classified key frames.

BRIEF DESCRIPTION OF THE DRAWINGS

The above and other features, aspects, and advantages of certain embodiment of the disclosure will be more apparent from the following description taken in conjunction with the accompanying drawings, in which.

DETAILED DESCRIPTION

Figure 1:
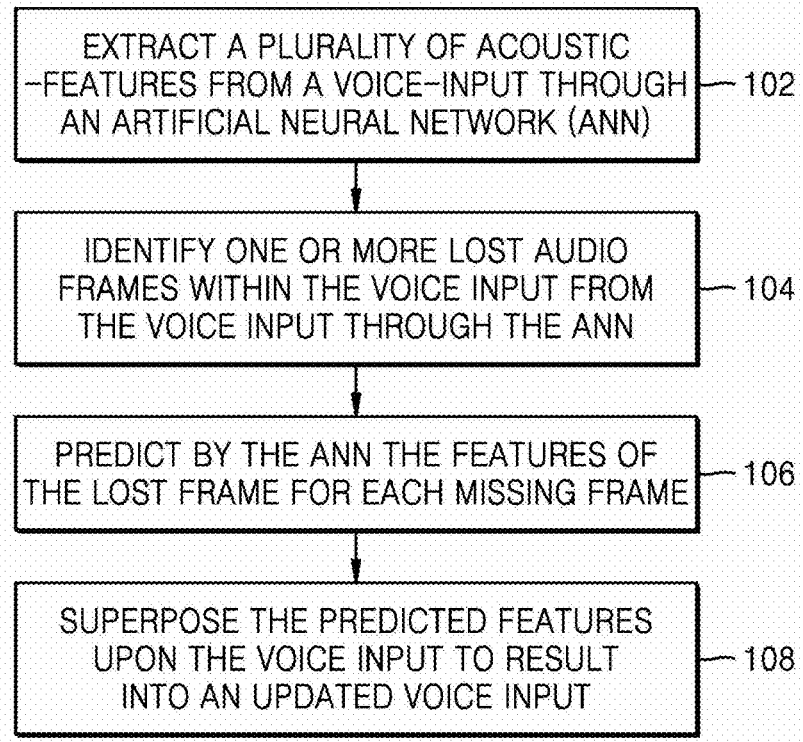
FIG. 1 illustrates a method of generating voice in an ongoing call session according to an embodiment.

For the purpose of promoting an understanding of the principles of the disclosure, reference will now be made to embodiments illustrated in the drawings and specific language will be used to describe the same. It will nevertheless be understood that no limitation of the scope of the disclosure is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the present disclosure and are not intended to be restrictive thereof.

Further, it will be appreciated that elements in the drawings are illustrated for simplicity and may not necessarily be drawn to scale. For example, the flow charts illustrate the method in terms of the most prominent operations involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises," "comprising," "includes," "including," or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises/includes . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

FIG. 1 illustrates a method to generate voice in an ongoing call session based on artificial intelligent techniques according to an embodiment. The method includes, in operation 102, extracting (a plurality of acoustic-features from a voice-input through an artificial neural network (ANN). Further, in operation 104, identifying one or more lost audio frames within the voice input from the voice input through the ANN.

Thereafter, the method includes, in operation 106, predicting by the ANN, the features of the lost frame for each missing frame. The predicting by the ANN may include operating a single-layer recurrent neural network for audio generation configured to predict raw audio samples. Such single-layer recurrent neural network may include an architecture defined by WaveRNN and a dual-softmax layer. Further, the method includes, in operation 108, superposing the predicted features upon the voice input to result into an updated voice input.

Further, the method includes correcting the updated voice input based on receiving the updated voice input and computing a confidence score of the correction. The received updated voice input is split into a plurality of phonemes based on a confidence score. One or more non-aligned phonemes are identified out of the plurality of phonemes based on comparing with language vocabulary knowledge.

Further, the method includes generating a plurality of variant phonemes, and updating the identified phonemes through replacement of the identified phonemes with the plurality of variant phonemes to update the plurality of phonemes with the variant phonemes. Other updating examples include addition of further phonemes to supplement the identified phonemes, and deletion of the identified phonemes. The updated voice input is regenerated based on replacement of the identified phonemes with the variant phonemes, removal of the identified phonemes, and supplementing of the identified phonemes by additional phonemes.

The method further includes converting the updated voice input defined by a whisper into the updated voice input defined by a normal voice-input based on the operation of executing a time-alignment between whispered and a corresponding normal speech, and learning by a generator adversarial network (GAN) model cross-domain relations between the whisper and the normal-speech. Finally, the voice quality of the updated voice input is improved based on a non-linear activation function.

Figure 2:
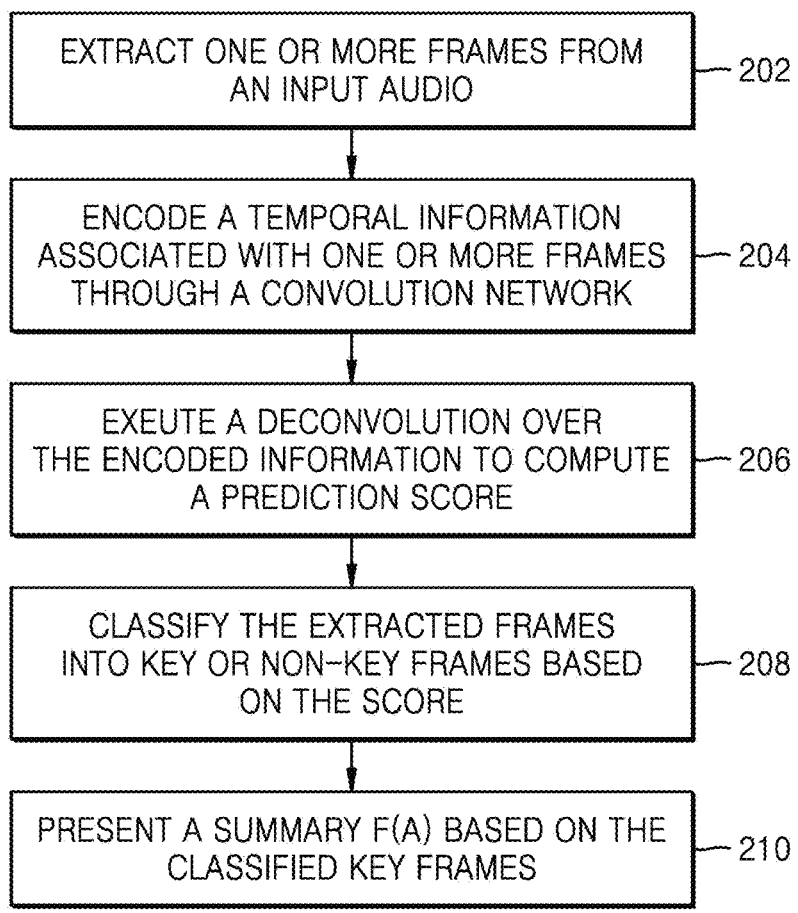
FIG. 2 illustrates a method of summarizing voice communication according to an embodiment.

FIG. 2 illustrates a method of summarizing voice communication in an ongoing call session based on artificial intelligent techniques according to an embodiment. The method includes, in operation 202, extracting one or more frames from an input audio. According to an embodiment, the extracting of one or more frames from the input audio includes extracting the frames from updated voice input as outputted from FIG. 1. In operation 204, the method includes encoding a temporal-information associated with one or more frames through a convolution network. In operation 206, deconvolution is executed over the encoded information to compute a prediction score. In operation 208, the method includes classifying the extracted frames into key or non-key frames based on the score. Further, in operation 210, a summary 'F(A)' is presented based on the classified key-frames.

According to an embodiment, the presenting of the summary may include learning relation between raw audio frames (A) and a set of summary audios (S), wherein a distribution of resultant summary-audios F(A) is targeted to be similar to the distribution of the set of summary audios (S). Thereafter, a summary discriminator is trained to differentiate between the generated summary audio F(A) and a real summary audio to improve the generated summary.

Figure 3:
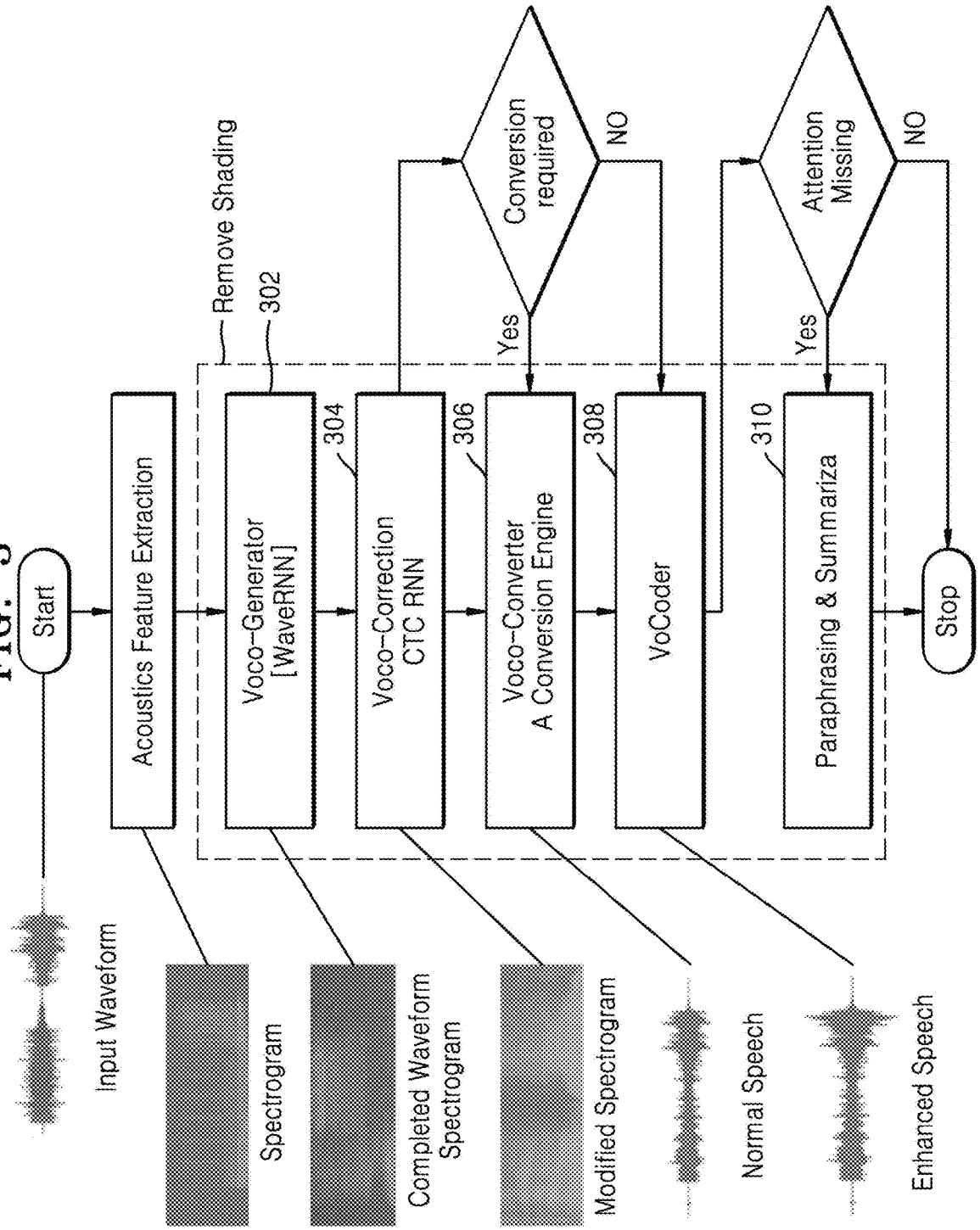
FIG. 3 illustrates an entire workflow corresponding to a sequential operation illustrated in FIGS. 1 and 2 according to an embodiment.

FIG. 3 illustrates an entire workflow corresponding to a sequential operation depicted in FIGS. 1 and 2 according to an embodiment.

As a precursor, an input waveform may undergo audio feature extraction to extract voice features raw audio-input and generate a spectrogram. In an example, the extracted features may correspond to Mel-frequency Cepstral Coefficients (MFCC) (39 features), Linear Predictive Cepstral Coefficients (LPCC) (39 features) and Gammatone Frequency Cepstral Coefficients (GFCC) (36 features). Further, the extracted features may undergo Principal Component Analysis (PCA) as a state of the art practice. According to an embodiment, the LPCC may include 13 LPCC features, 13 Delta LPCC features, and 13 Delta Delta LPCC features. According to an embodiment, the MFCC may include 12 MFCC Cepstral Coefficients, 12 Delta MFCC Cepstral Coefficients, 12 Double Delta MFCC Cepstral Coefficients, 1 Energy Coefficient, 1 Delta Energy Coefficient, and 1 Double Delta Energy Coefficient. According to an embodiment, the GFCC may include 12 GFCC Coefficients, 12 Delta GFCC Coefficients, and 12 Double GFCC Cepstral Coefficients.

In operation 302, the method includes generating the audio packets which are lost due to vocal issues including packets lost due to network issues. Accordingly, a complete waveform spectrogram is generated from the spectrogram. According to an embodiment, operation 302 may be implemented at receiver end and not at the transmitter, since audio/voice may be poor or substandard due to network quality. According to an embodiment, operation 302 may include pruning of nodes in the neural network (e.g. using Lottery Ticket hypothesis, LTH) for fast convergence and inference. In an example, nodes having major weights after training are shortlisted for further use, rest are discarded.

In operation 304, the method includes generating modified spectrogram from a complete spectrogram.

In operation 306, the method includes generating normal speech-signal back from the spectrogram. In an example, a single layer recurrent neural network is used for audio generation and fast inference time.

In operation 308, the method includes generating an enhanced speech from the normal-speech.

In operation 308, the method includes generating paraphrasing & summarization of the enhanced speech.

The operations 302 to 308 refer the operations 102 to 108 of FIG. 1, respectively, and the operation 310 corresponds to the operation of FIG. 2 and accordingly represents the conjoined operation of operations 202 to 208.

Figure 4:
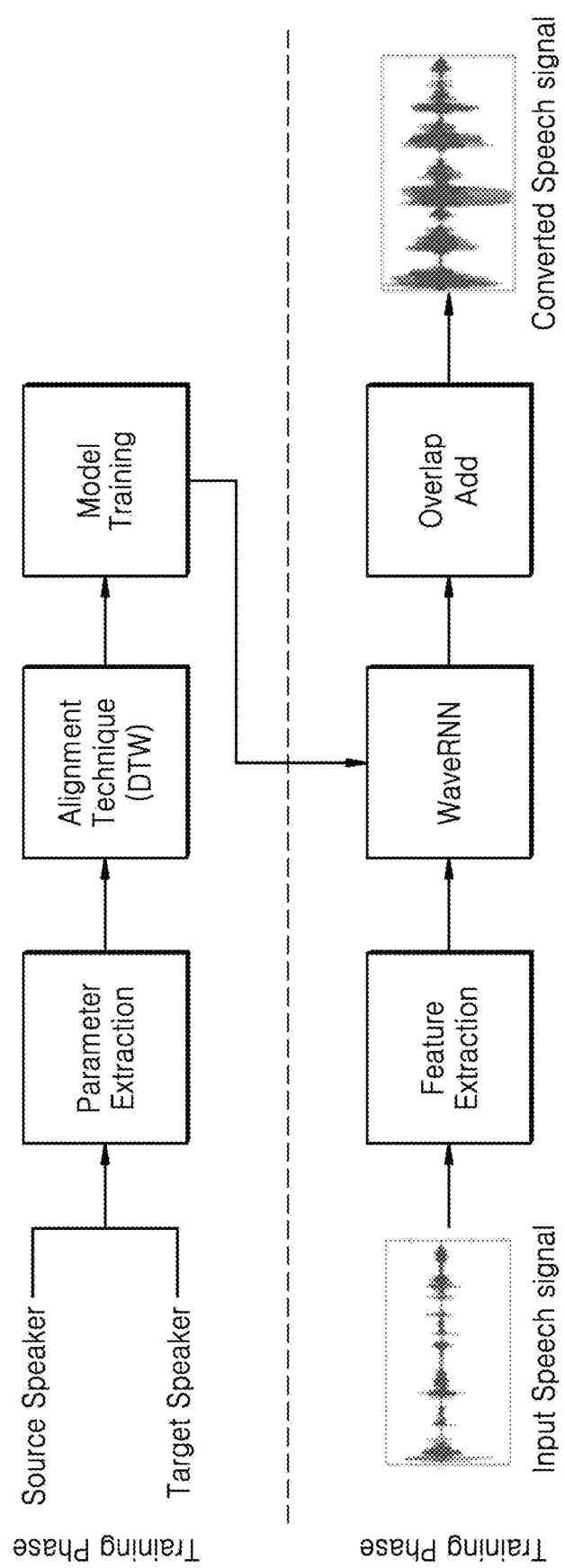
FIG. 4 illustrates generation of the audio packets according to an embodiment.

FIG. 4, illustrates generation of the audio packets which are lost due to vocal issues, the lost packets including the packet loss due to network and accordingly corresponds to operation 302.

In an implementation, as a speech-conversion criteria, Real-time PLC (Packet loss concealment) algorithms for the lost packets are applied. For each lost frame, deep model estimates the features of the lost-frame and overlaps them with audio-content. The method may be a "Model-based WaveRNN" method that leverages speech models of interpolating and extrapolating speech gaps.

As illustrated in FIG. 4, the method may include a training phase and a testing phase. In the training phase, the method may include parameter extraction, alignment and model training operations. In the testing phase, the method may include feature extraction, Model-based WaveRNN, and overlap addition operations. According to an embodiment, the Model-based WaveRNN may be based on model trained from the training phrase.

Figure 5:
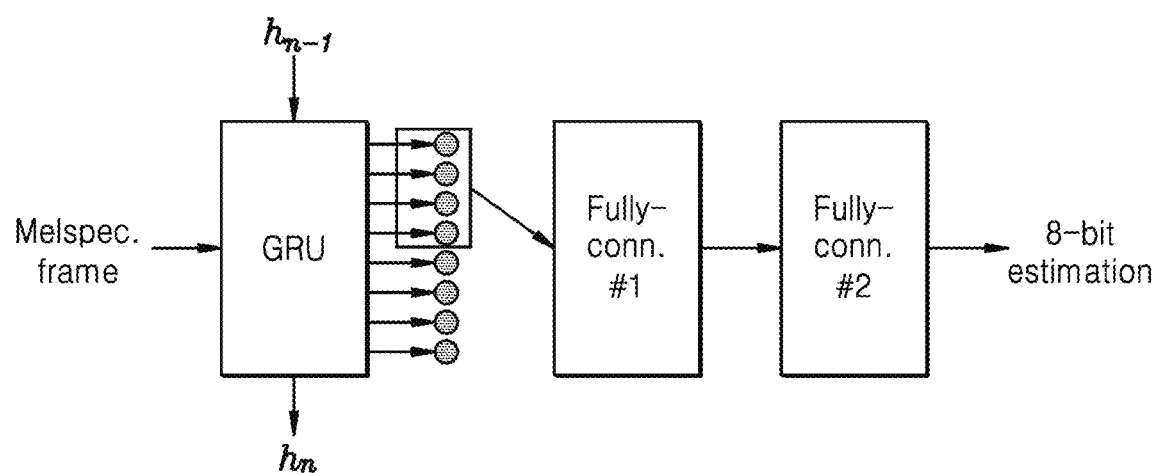
FIG. 5 illustrates a single-layer recurrent neural network according to an embodiment.

FIG. 5 illustrates WaveRNN as a single-layer recurrent neural network for audio generation according to an embodiment. The WaveRNN is designed efficiently predict raw-audio samples and accordingly corresponds to operation 302. The architecture of the WaveRNN with the dual soft-max-layer and computation is provided in FIG. 5.

As an example, for estimation of a single coarse or fine-bits:
  1 gated recurrent units (GRU) (composed of 3 matrices)+2 fully connected (FC) layers (1 matrix for each FC layer)

Figure 6:
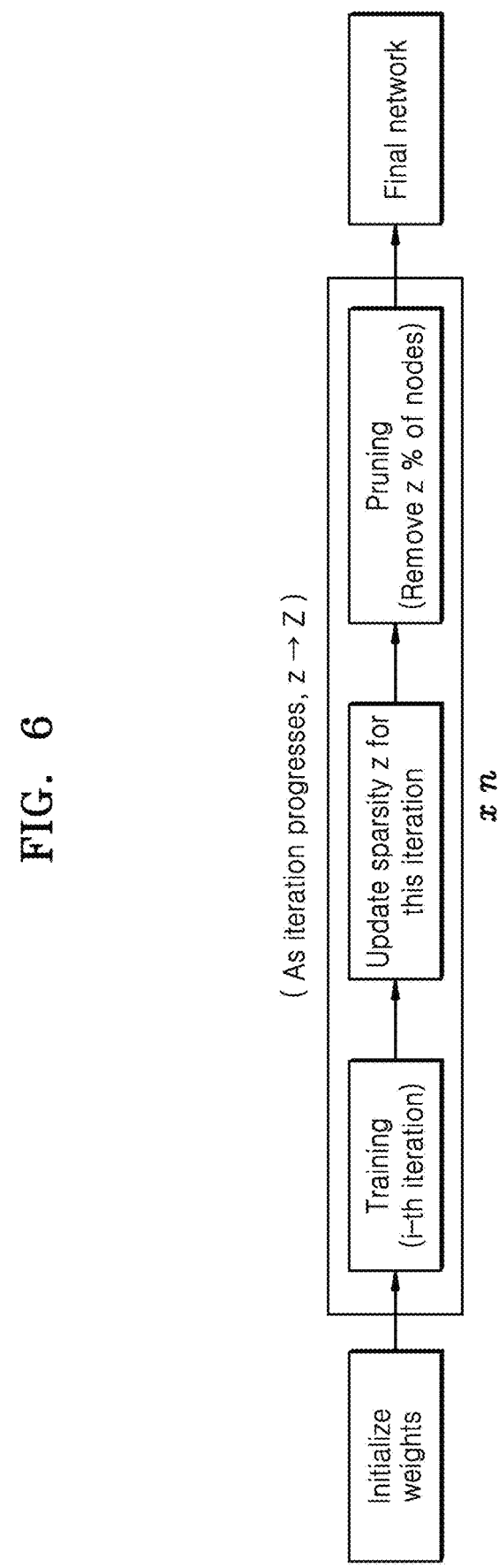
FIG. 6 illustrates pruning of nodes in the network according to an embodiment.

Example dimension of network components is provided as follows:
Hyper-Parameters
  $dim_{GRU}$: dimension of a GRU unit
  $dim_{FC1}$: dimension of FC #1 layer
  $dim_{FC2}$: dimension of FC #2 layer
  $dim_{mel}$: dimension of input melspec frames (usually, it's 80)
  $dim_x$: dimension of input samples
    $dim_x=3$ in WR, concatenation of fine for (t−1) and coarse for t and (t−1)
Dimension of Matrices
GRU
  For each matrix, $dim_{GRU} \times (dim_{GRU}+dim_{mel}+dim_x)$
Fully-Connected (FC) Layers $(dim_{GRU}/2) \times dim_{FC1}$     FC #1:

$dim_{FC1} \times dim_{FC2}$     FC #2:

FIG. 6 illustrates a Sparse WaveRNN for pruning of nodes in the network and corresponds to operation 302 of FIG. 3. According to an embodiment, the characteristics of Sparse WaveRNN may be represented as follows:

$$z = Z\left(1 - \left(1 - \frac{t-t_0}{S}\right)^3\right)$$

Here, z represents the updating rule.

The target sparsity Z is set to 90~95.8%. According to an embodiment, only matrices in the GRU unit are pruned. According to an embodiment, iterative pruning is adopted. As a part of pruning, nodes are pruned after every 100 iterations based on calculated z. Optionally, Lottery Ticket Hypothesis (LTH) is adoptable.

As a part of pruning of nodes in the network, a few nodes having major weights (post training) is retained for fast convergence and inference. The relatively unnecessary nodes are removed. The relatively unnecessary nodes are removed.

Figure 7:
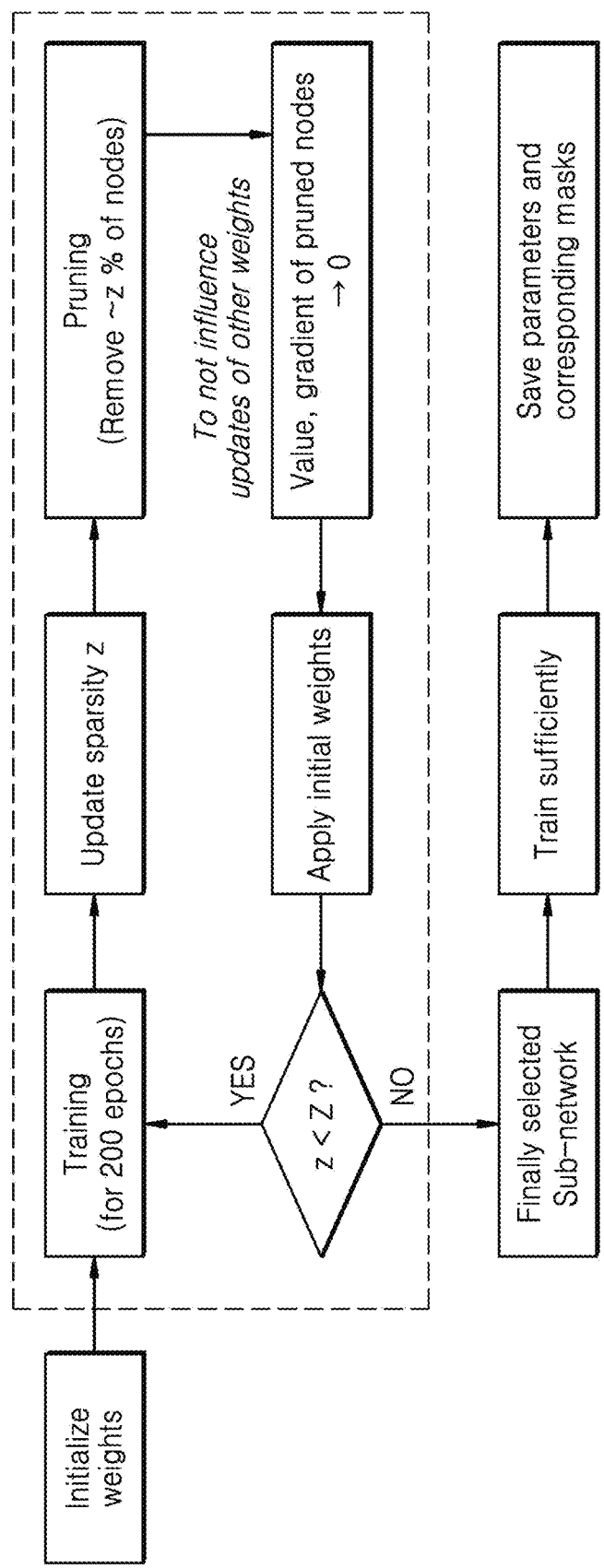
FIG. 7 illustrates pruning of nodes in the network according to an embodiment.

FIG. 7 illustrates an example application of Lottery Ticket Hypothesis (LTH) to sparse WaveRNN for pruning of nodes as referred in FIG. 6 according to an embodiment. According to an embodiment, a sun-network or pruned network is provided that guarantees "Fast training" and "same or better classification accuracy". The found sub-network is called "winning ticket".

"Lottery Ticket Hypothesis" (LTH) refers a state of the art way to find "winning ticket" with randomly-initialized network weights. The same is verified for the classification tasks and adoptable for iteratively done pruning.

Figure 8:
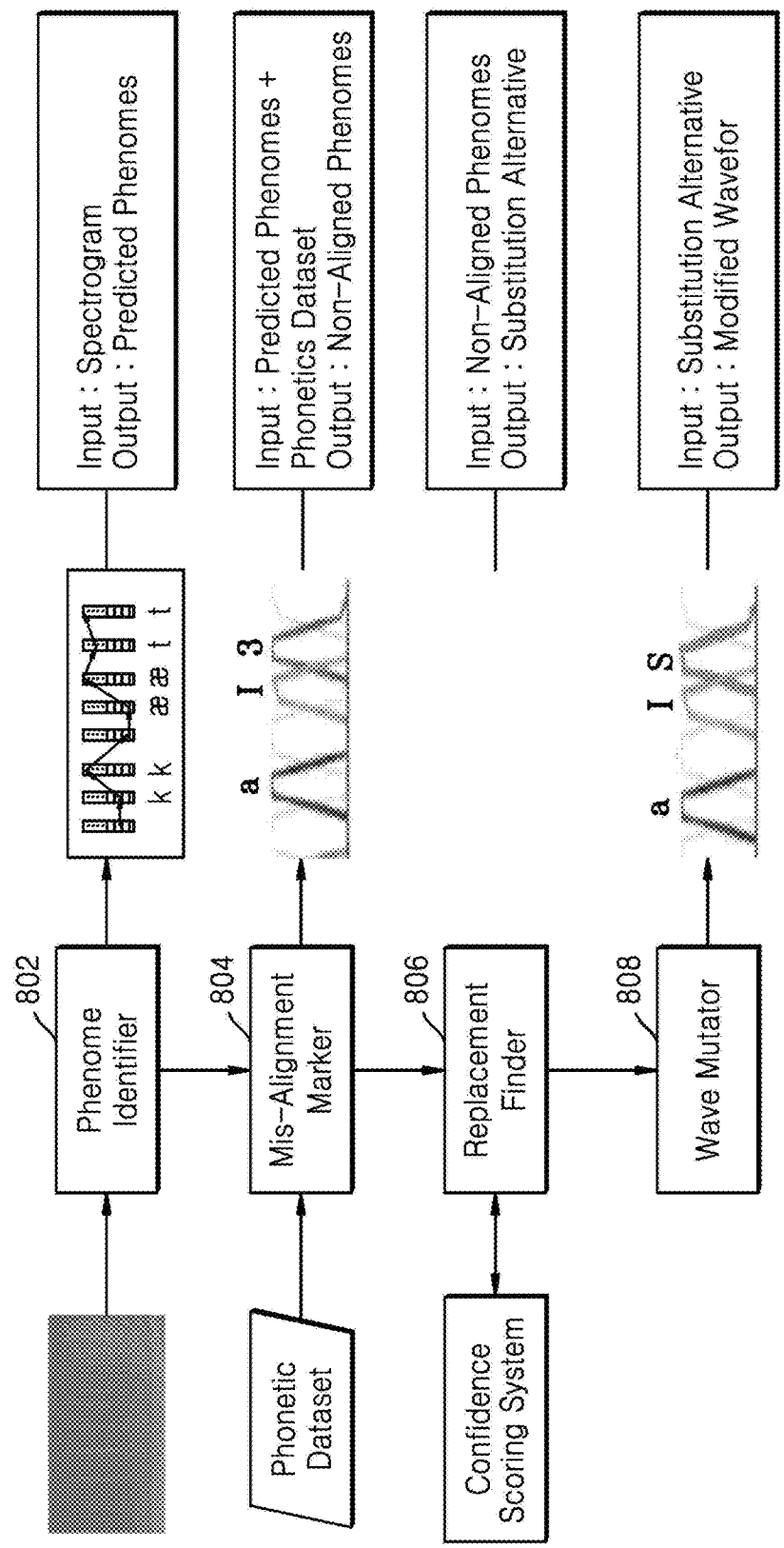
FIG. 8 illustrates a temporal classification model for correction of the generated voice for lost packets according to an embodiment.

FIG. 8 illustrates a connectionist temporal classification model for correction of the generated voice for lost packets from FIGS. 3 to 7 and refers to operation 304 of FIG. 3. Specifically, the method includes correcting the updated voice input based on receiving the updated voice input and computing a confidence score thereto. The received updated voice input is split into a plurality of phonemes based on a confidence score. One or more non-aligned phonemes are identified out of the plurality of phonemes based on comparing with language vocabulary knowledge. Following are the elements of operation:

Element 802 refers phoneme identifier for breaking of incoming voice (i.e. spectrogram) into phonemes based on confidence score to result into predicted-phonemes.

Element 804 refers mis-alignment marker for identification of non-aligning phonemes by comparing with language vocabulary-knowledge. The dataset of predicted phonemes and phonetics dataset acts as an input while non-aligned phonemes are outputted.

Element 806 refers a replacement-finder for non-aligned phonemes. Mutations are generated for identified phonemes to maximize a goodness of pronounciation (GOP) score or a confidence score and thereby result in a substitution-alternative. For such purposes, a confidence scoring system assists the replacement finder in the present operation by scoring substitution, insertion and deletion alternatives.

Element 808 refers a wave-mutator to apply mutation to the waveform to remedy the problem. A substitution alternative from element 806 is provided as input and a modified-waveform is outputted.

Figure 9A:
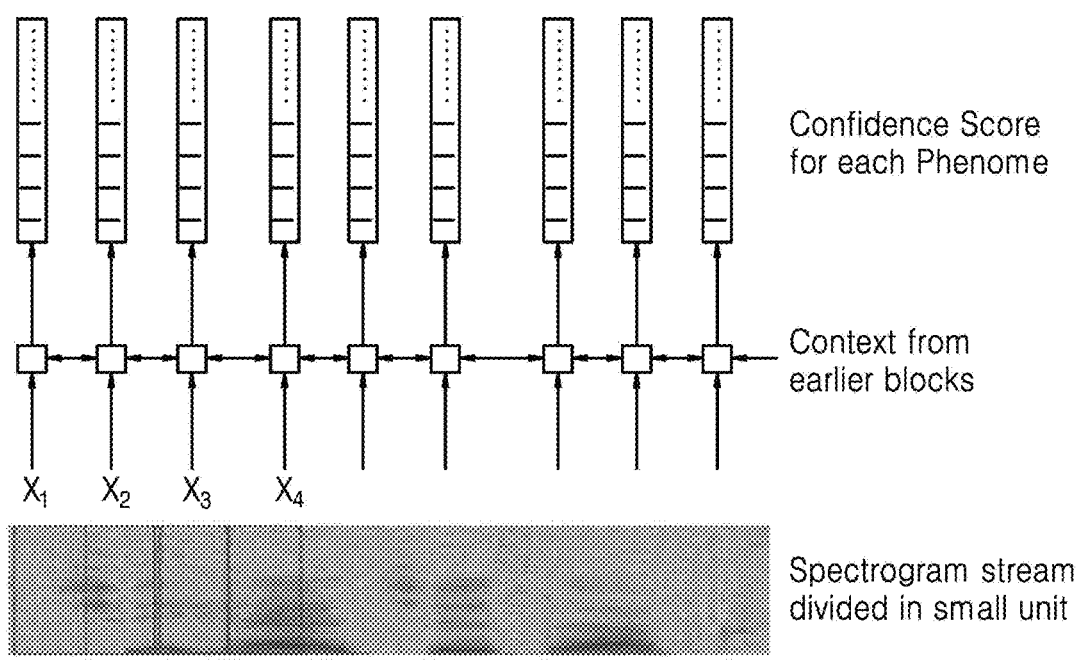
FIGS. 9A and 9B illustrate a phoneme-identifier according to an embodiment.
Figure 9B:
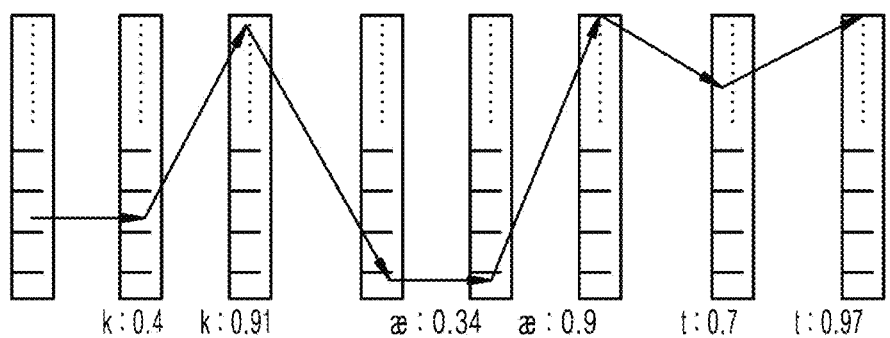

FIGS. 9A and 9B illustrates a phoneme-identifier corresponding to element 802 in FIG. 8. Specifically, the method includes generating a plurality of variant phonemes, and updating the identified phonemes through replacement of the identified phonemes with the plurality of variant phonemes to update the plurality of phonemes with the variant phonemes. Other updating examples include addition of further phonemes to supplement the identified phonemes, and deletion of the identified phonemes. The updated voice input is regenerated based on replacement of the identified phonemes with the variant phonemes, removal of the identified phonemes, and supplementing of the identified phonemes by additional phonemes.

As a part of operation of phoneme-identifier, the Spectrogram is broken into small units [X1, X2, X3 . . . ] and analyzed. Previous blocks score is used to provide context. Each block mapped to a confidence score for 44 phonemes and pause. In an example, the phoneme sequence [k æ t] is found in spectrogram for spoken word "CAT".

Figure 10:
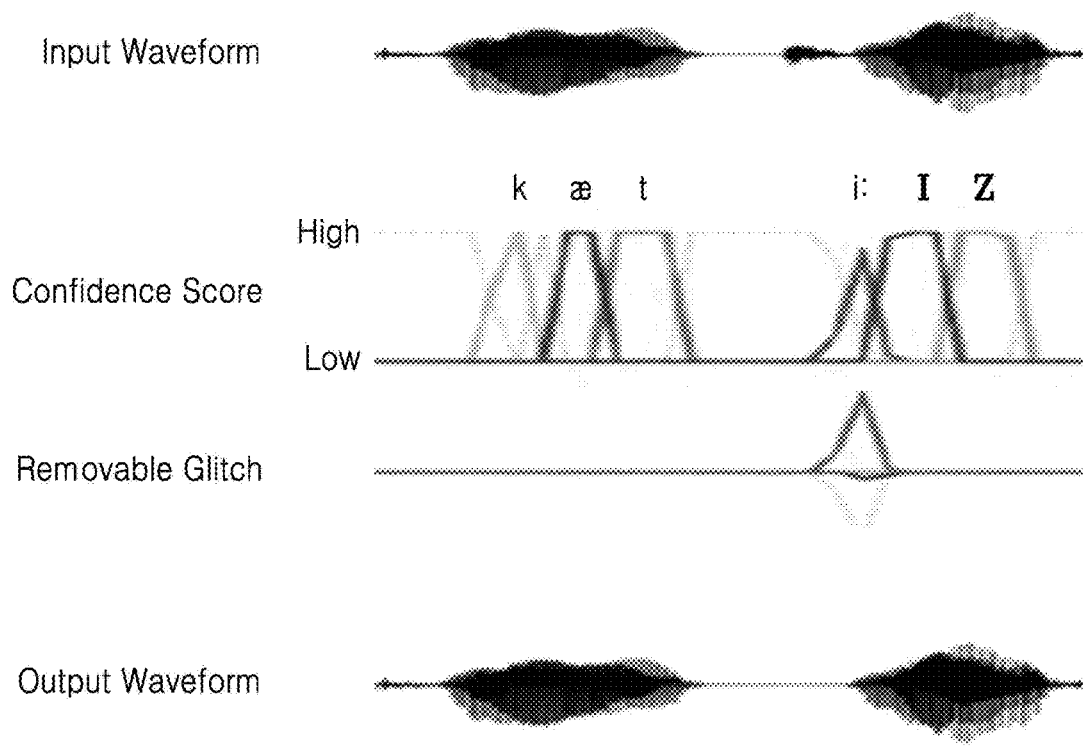
FIG. 10 illustrates a misalignment marker according to an embodiment.

FIG. 10 illustrates a misalignment marker corresponding to element 804. As every piece of spectrogram is mapped to a phoneme, sometimes a sound or phoneme may not be fully identified. In some cases the high probability phoneme does not fit with previous context as per language vocabulary. Such sounds may be because of network glitch or speaker stammering etc. Such error is removed by applying inverse of glitch to the slice of waveform effected. For example, removing a glitch "e [i:]" from spoken words "Cat [k æ t] is [k æt] is [t z]"

Figure 11:
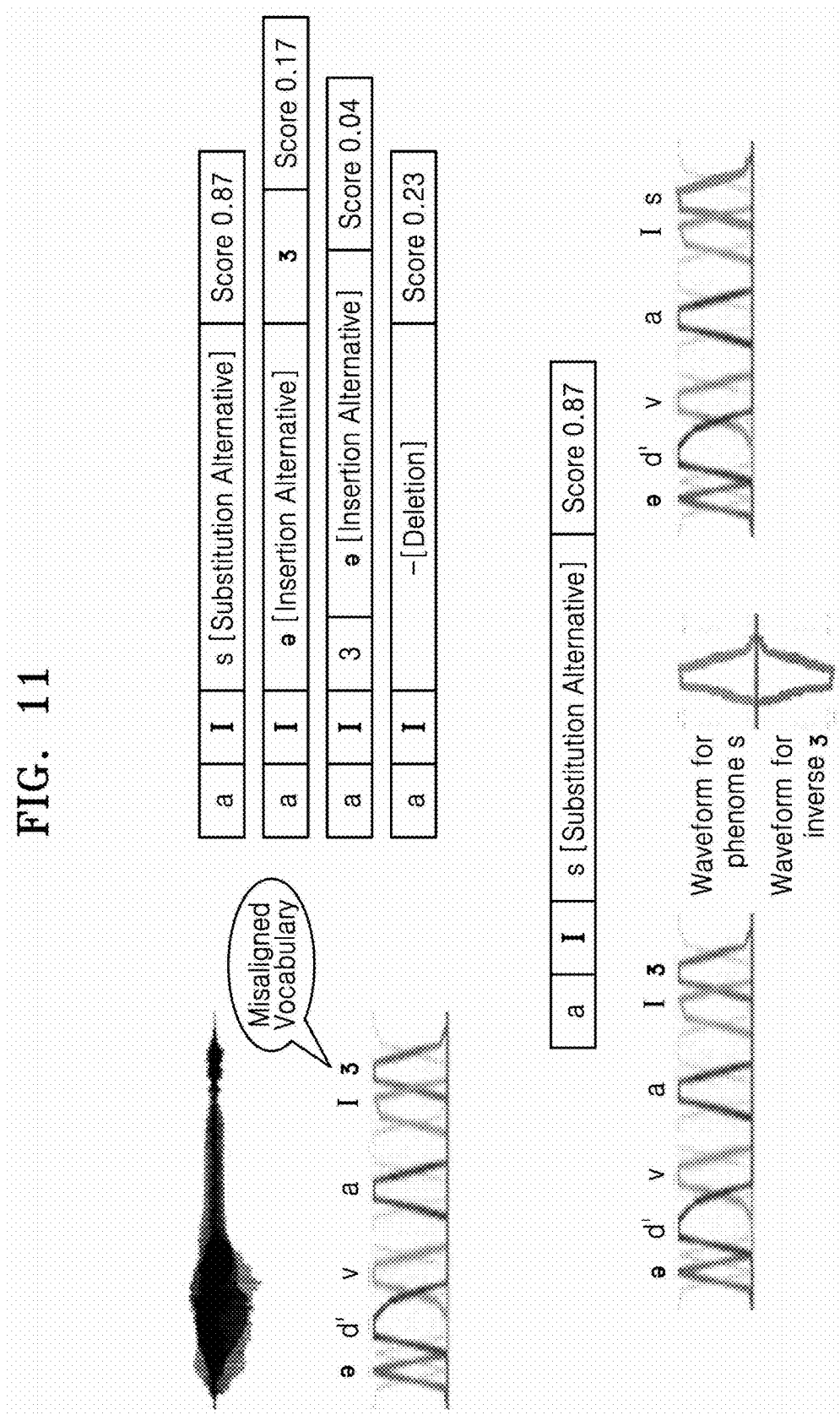
FIG. 11 illustrates a replacement finder operation according to an embodiment.

FIG. 11 illustrates a replacement finder operation corresponding to element 806. For misaligned phonemes, the model calculates GOP [Goodness of Pronunciation] score for four different methods and each eligible phoneme Y. The phoneme X is substituted with another phoneme Y. The phoneme Y is inserted before phoneme X. A phoneme Y is inserted after X. Thereafter, the phoneme X is deleted. E.g. Advice should be pronounced as [ə d' v a ɪ s] but speaker pronounced as [ə d' v a ɪ ʒ].

Figure 12:
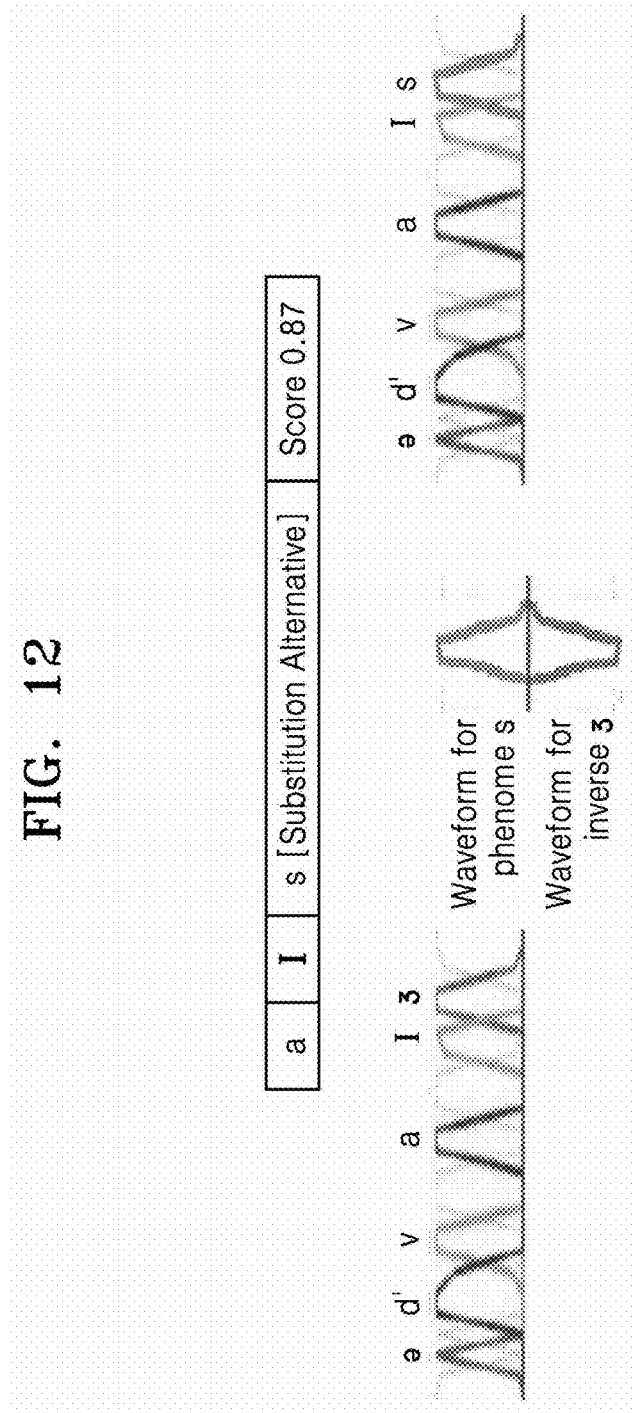
FIG. 12 illustrates a wave mutator according to an embodiment.

FIG. 12 illustrates a Wave Mutator corresponding to element 808. For the method providing highest GOP score, the slice of waveform for phoneme X is modified as follows
a) For substitution, apply inverse X waveform and Y waveform.
b) For pre-insertion, insert Y waveform before the slice.
c) For post-insertion, insert Y waveform after the slice.
d) For deletion, Apply inverse X waveform and remove silence if needed.

In an example, the substitution score with phoneme s is found as maximum. So inverse of ʒ and s is transposed in the waveform slice containing ʒ.

Figure 13A:
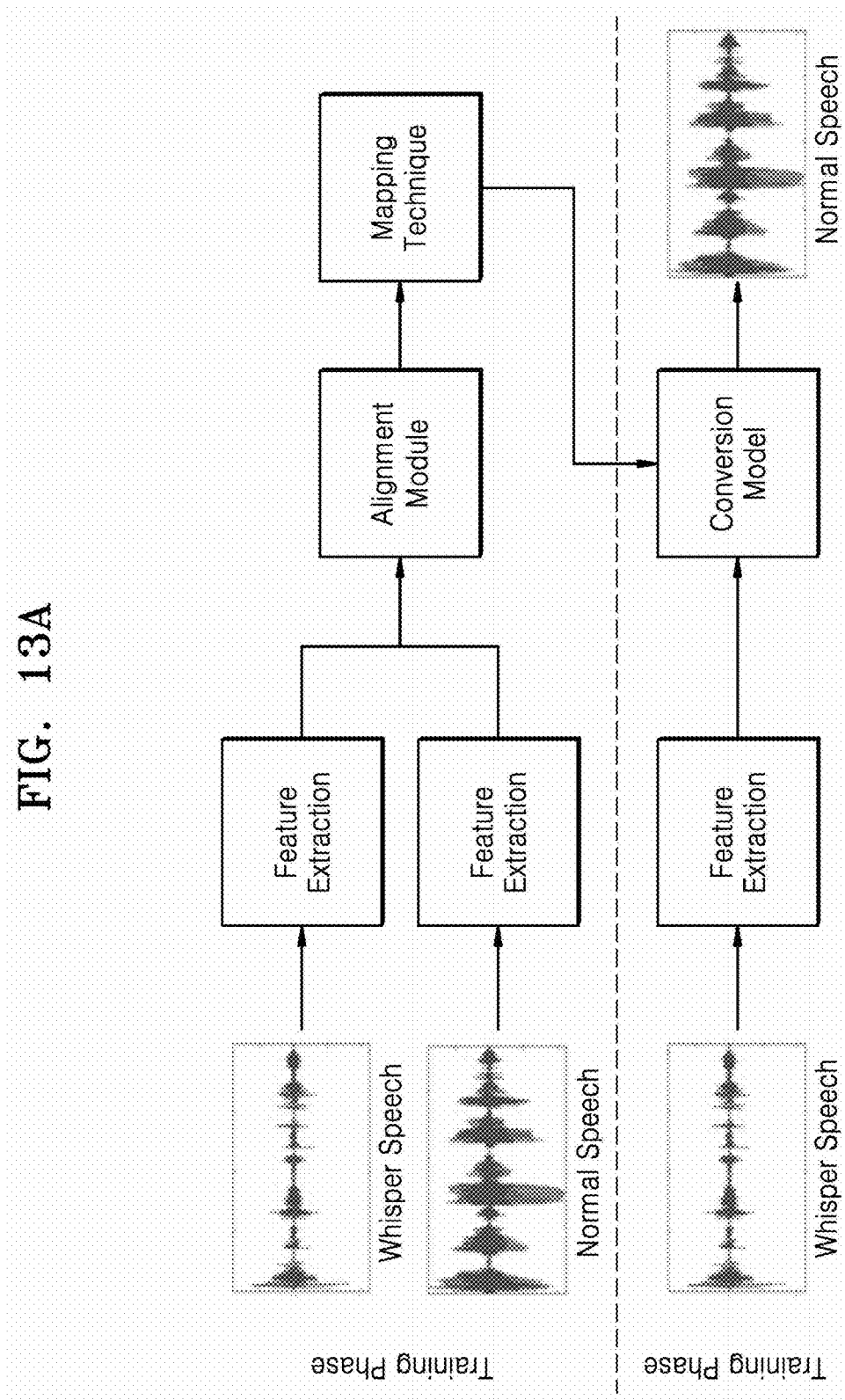
FIGS. 13A and 13B illustrate a whisper to/from normal speech conversion criteria according to an embodiment.
Figure 13B:
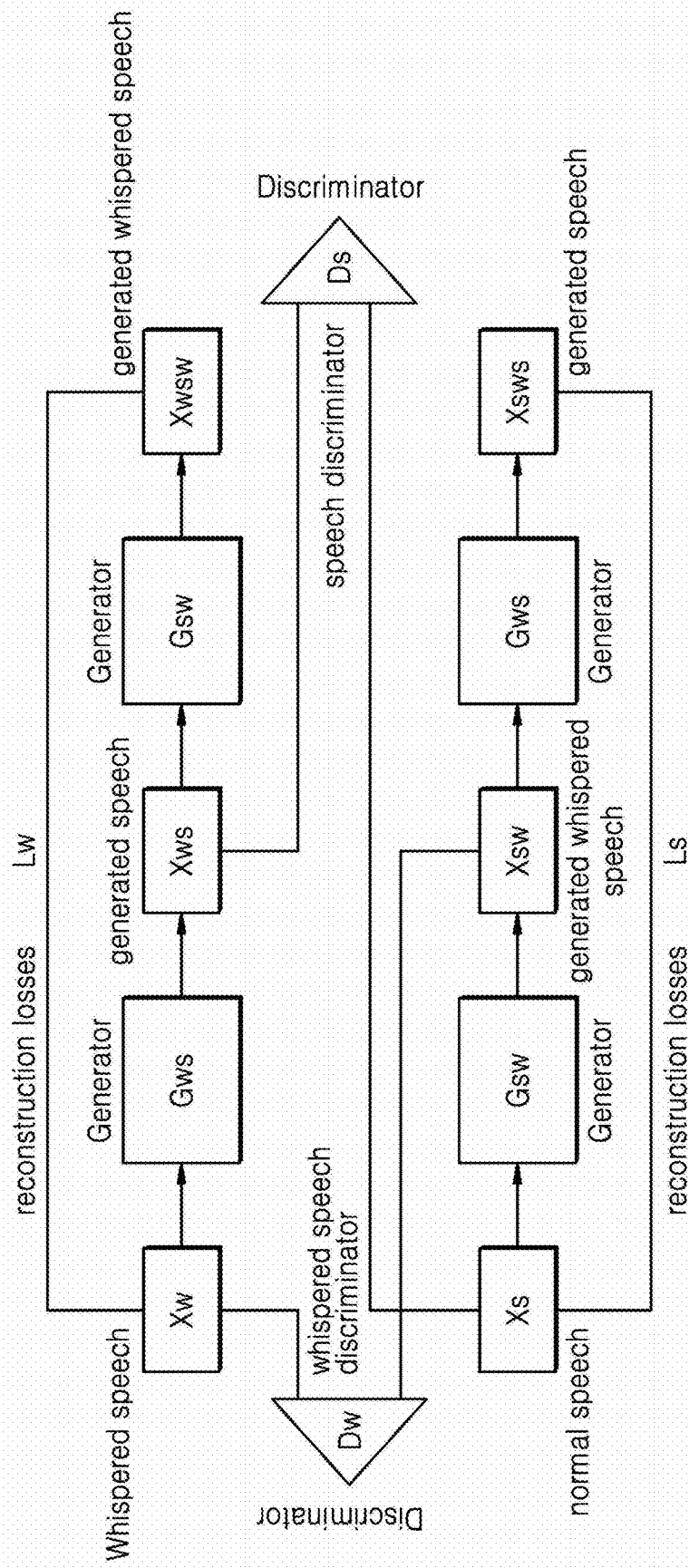

FIGS. 13A and 13B illustrate a whisper to/from normal speech conversion criteria and corresponds to operation 306 of FIG. 3 and operation 106 of FIG. 2. Specifically, the method includes converting the updated voice input defined by a whisper into the updated voice input defined by a normal voice-input based on the operations of executing a time-alignment between whispered and a corresponding normal speech, and learning by a generator adversarial network (GAN) model cross-domain relations between the whisper and the normal-speech FIG. 13A illustrates an Alignment Module. A Dynamic Time Warping (DTW) criteria is applied for time alignment between whispered and its corresponding normal speech. A mapping technique is provided wherein GAN module is used to learn the cross-domain relations (w.r.t. attributes of the speech production mechanism) between the whispered and the normal speech. A conversion model is provided for converting the features.

As illustrated in FIG. 13A, the method may include a training phase and a testing phase. In the training phase, the method may include parameter extraction, alignment and mapping operations. In the testing phase, the method may include feature extraction and conversion model. According to an embodiment, the conversion model may be based on mapping from the training phrase.

FIG. 13B illustrates a Conversion Model GAN architecture which is used to draw mapping between the cepstral features corresponding to the whispered and the normal speech. Further, mapping is drawn between the converted cepstral features and the corresponding FO of the normal speech. FO represents the fundamental frequency at which vocal chords vibrate in voiced sounds.

A deep neural network (DNN) with three hidden layers (each contains 512 neurons) is implemented for both the discriminators and the generators of FIGS. 13A and 13B. The various types of losses may be defined as follows:
Adversarial Loss may represent as followed:
Generator Loss:

$$L_D = -E_{x_{w-pw}}[\log(D_w(X_w))] - E_{x_{s-ps}}[1-\log(D_w(G_{sw}(X_s))]$$

Discriminator Loss:

$$L_G = -E_{x_{s \sim p_s}}[\log(D_w(G_{sw}(X_s)))] + \frac{1}{2}E_{x_{w \sim p_w}, x_{s \sim p_s}}[\log(X_w) - \log(G_{sw}(X_s))]^2$$

Loss for Reconstructing Whispered Speech:

$$L_w = d(G_{sw}(G_{ws}(X_w)), X_w)$$

Loss for Reconstructing Normal Speech:

$$L_s = d(G_{ws}(G_{sw}(X_s)), X_s)$$

Figure 14:
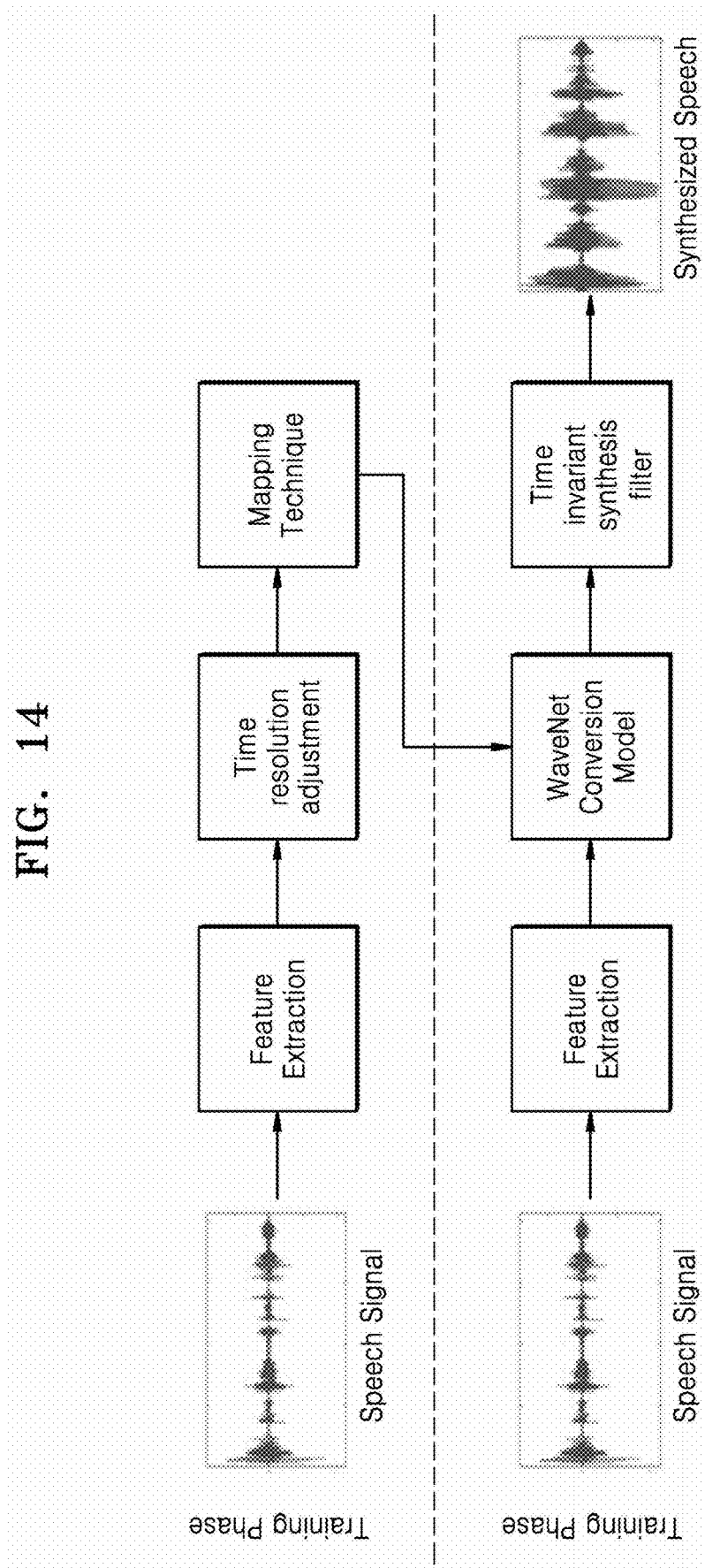
FIG. 14 illustrates a encoder to improve the voice quality according to an embodiment.

Parameters may be defined as follows
$G_{ws}$: Generators
$G_{sw}$: Generators
$X_w$: Whispered Speech
$X_s$: Normal Speech
$D_w$: Discriminator
$D_s$: Discriminator FIG. 14 illustrates a WaveNet VOCODER to improve the voice quality of converted speech signal and corresponds to operation 308 of FIG. 3 and operation 108 of FIG. 1. In an example, Sigmoid, ReLU, and Tan H have been applied as a nonlinear activation functions in all the architectures As illustrated in FIG. 14, the method may include a training phase and a testing phase. In the training phase, the method may include parameter or feature extraction, time resolution adjustment and mapping operations. In the testing phase, the method may include feature extraction, WaveNet conversion model, and time invariant synthesis filter operations. According to an embodiment, the WaveNet conversion model may be based on mapping from the training phrase.

Figure 15:
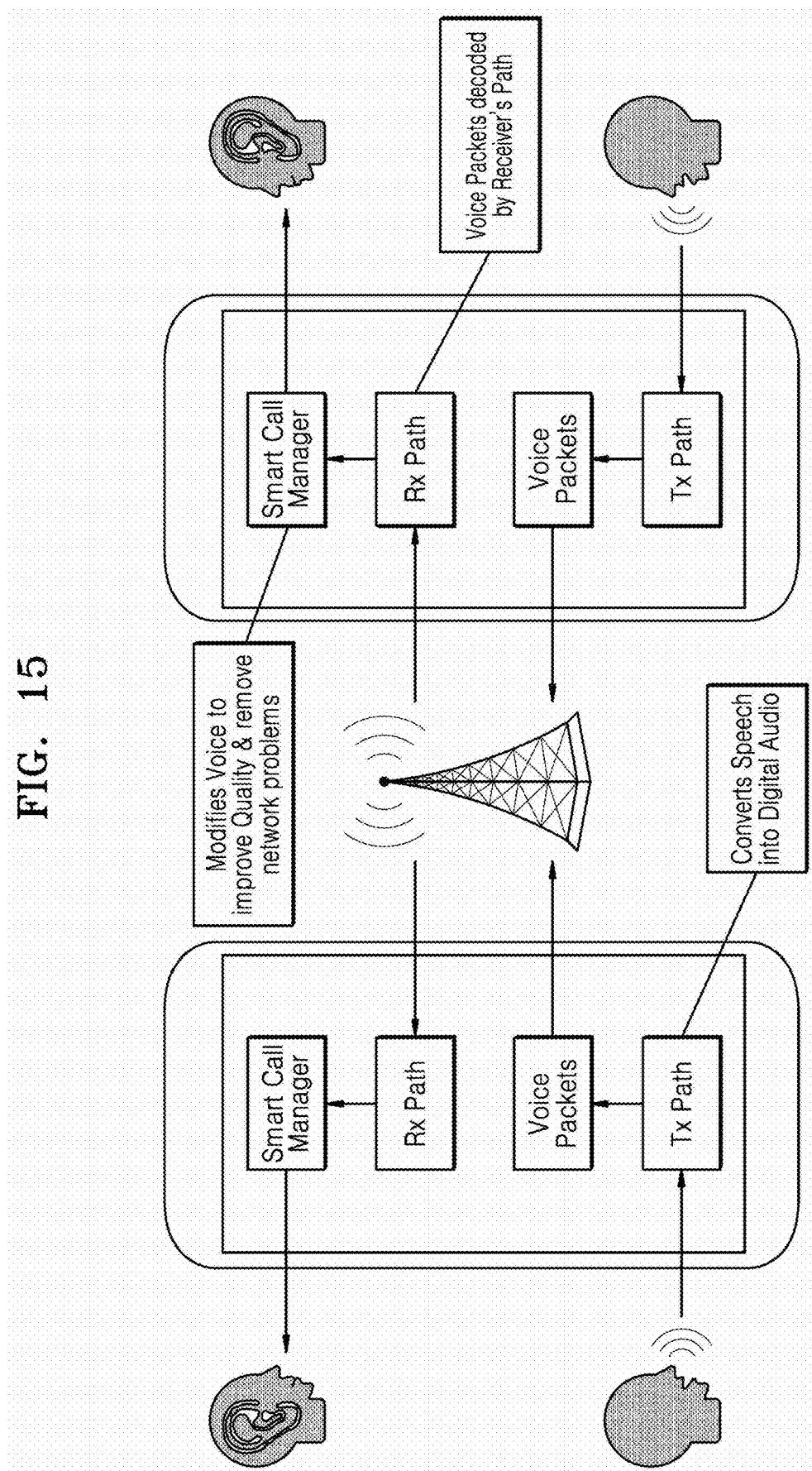
FIG. 15 illustrates an on-device voice engine according to an embodiment.

FIG. 15 illustrates a smart on-device voice engine "Smart Call Manager" as illustrated in FIGS. 1-14 that enhances the quality of communication using AI and ML techniques for audio remediation (e.g. Generation, Correction and conversion), and deep listening. Audio remediation as facilitates by the present subject matter is the process of enhancing the quality of voiceless verbal syllables and words by reinforcing the existing packets and generating the missing packets based on the vicinity. As a part of deep listening, the AI module hears to understand and remember what's been said, and respond when requested.

Figure 16:
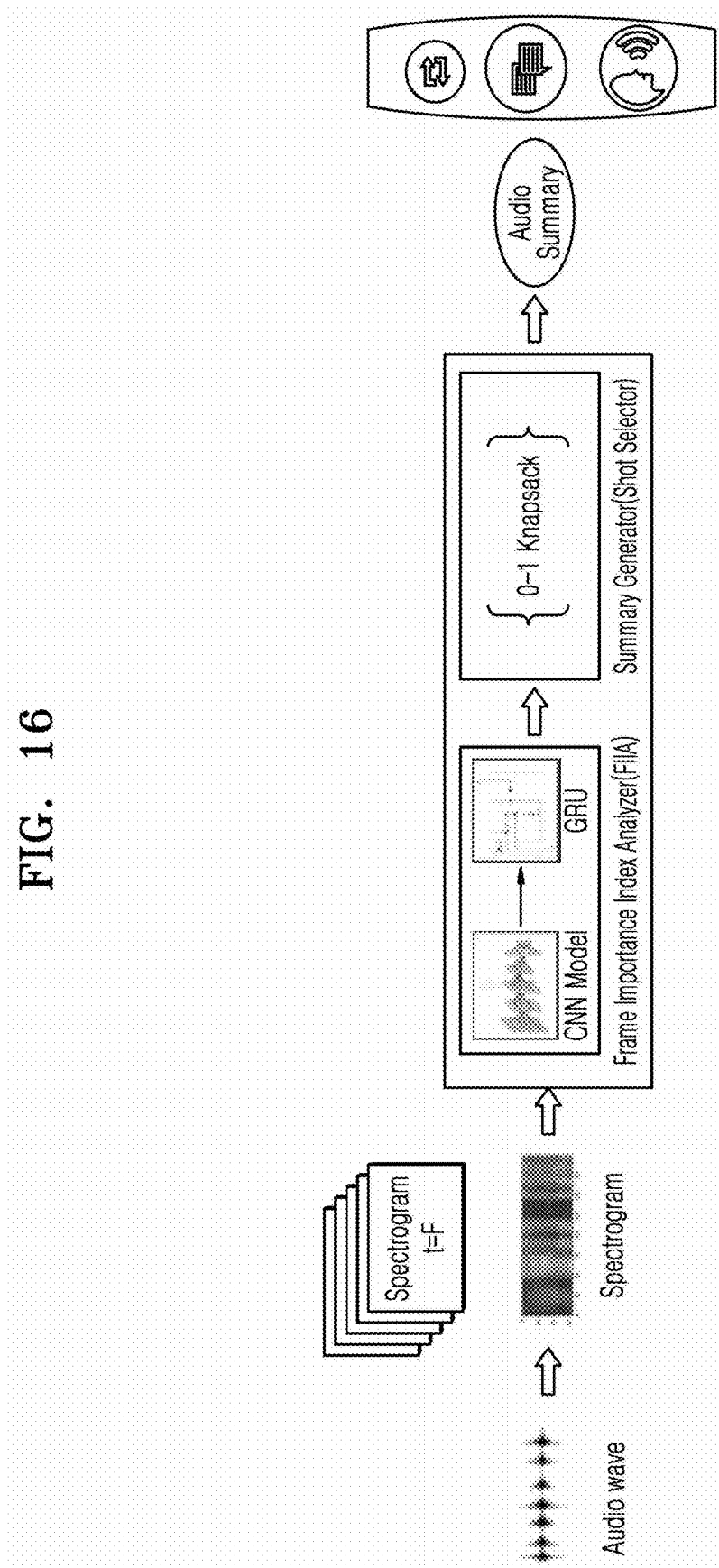
FIG. 16 illustrates summary/paraphrase generation according to an embodiment.

FIG. 16 illustrates a multitask approach for summary/paraphrase generation in accordance with operations 202 to 208 of FIG. 2 and operation 310 of FIG. 3. The optimal audio summaries are generated using a set of:

a) raw audio frames (A); and a b) set of summary audios (S), without any correspondence.

The model learns a mapping function (key frame selector) F: A→S such that the distribution of resultant summary audios from F(A) is similar to the distribution of S with the help of an adversarial objective. Thereafter, a summary discriminator is trained that differentiates between a generated summary audio F(A) and a real summary audio s∈S.

Overall, the model may include two sub-networks Key frame selector network (SK) and Summary discriminator network (SD) as described in FIG. 17 and FIG. 18 respectively.

Figure 17A:
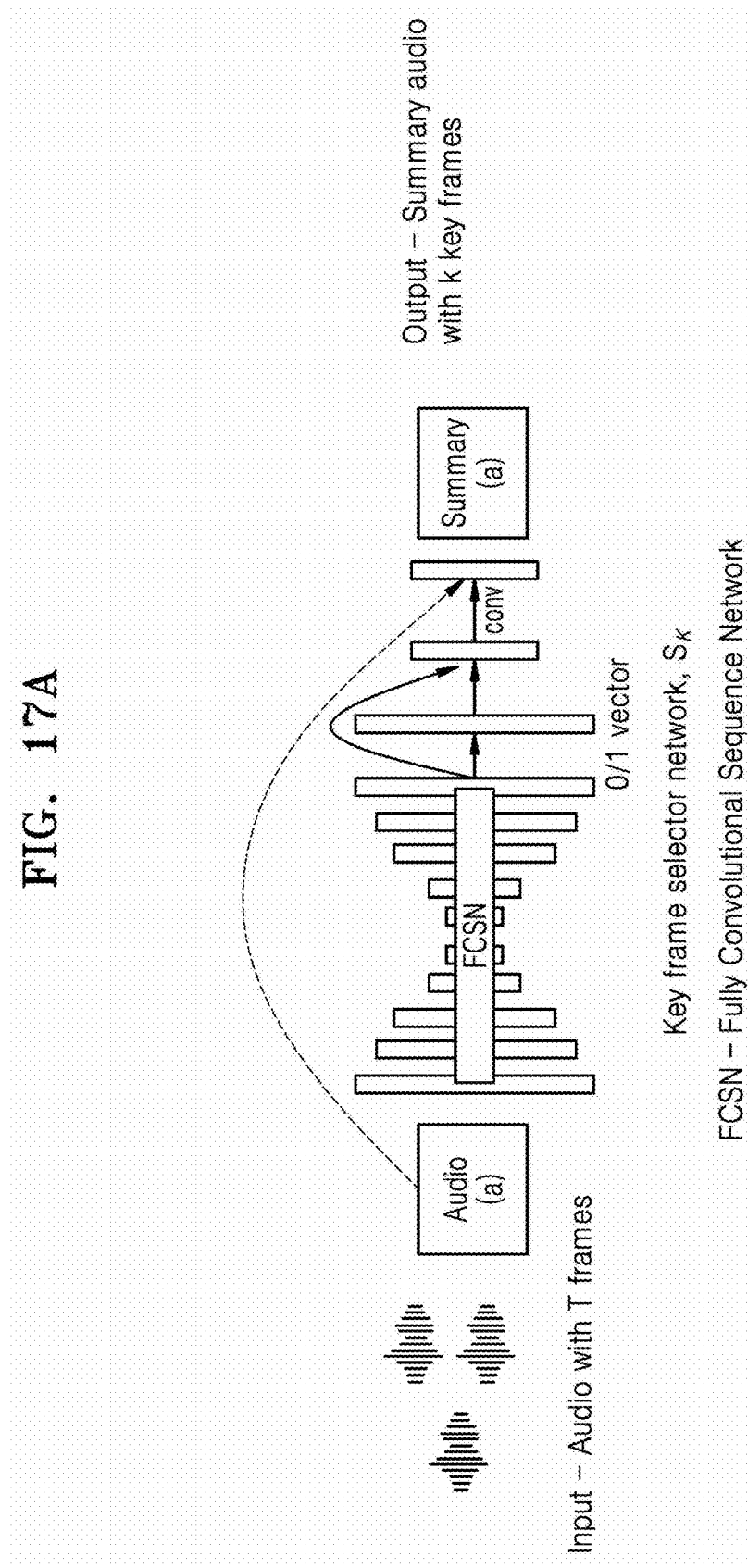
FIGS. 17A and 17B illustrate a key frame selector network according to an embodiment.
Figure 17B:
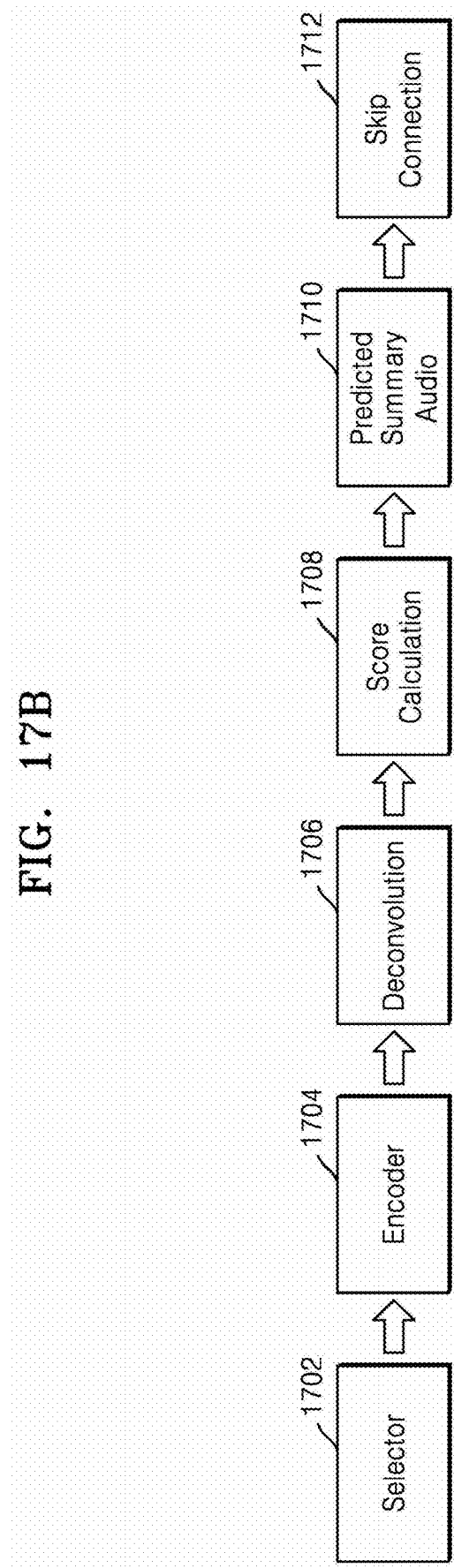

FIGS. 17A and 17B illustrate Key Frame selector network and accordingly corresponds to the operations 202 to 208 of FIG. 2. Specifically, FIG. 17A illustrates a Fully Convolutional Sequence Network (FCSN) and FIG. 17B a corresponding flow of operation described in operations as follows:

At operation 1702, Key Frames are selected from Input Audio.

At operation 1704, the temporal information is encoded by performing convolutional and Pooling.

At operation 1706, Temporal deconvolution operations produces prediction score vector.

At operation 1708, a score indicating key/non key Frame is provided.

At operation 1710, 'k' Key Frames are selected to form predicted summary.

At operation 1712, frame-level feature are retrieved to merge with reconstructed features.

Figure 18A:
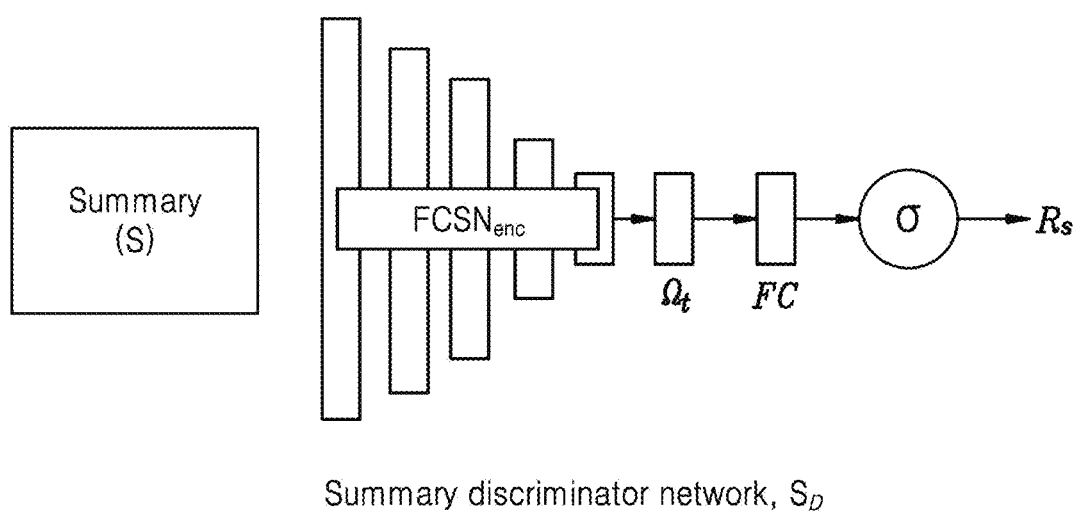
FIGS. 18A and 18B illustrate a summary generator-discriminator network according to an embodiment.
Figure 18B:
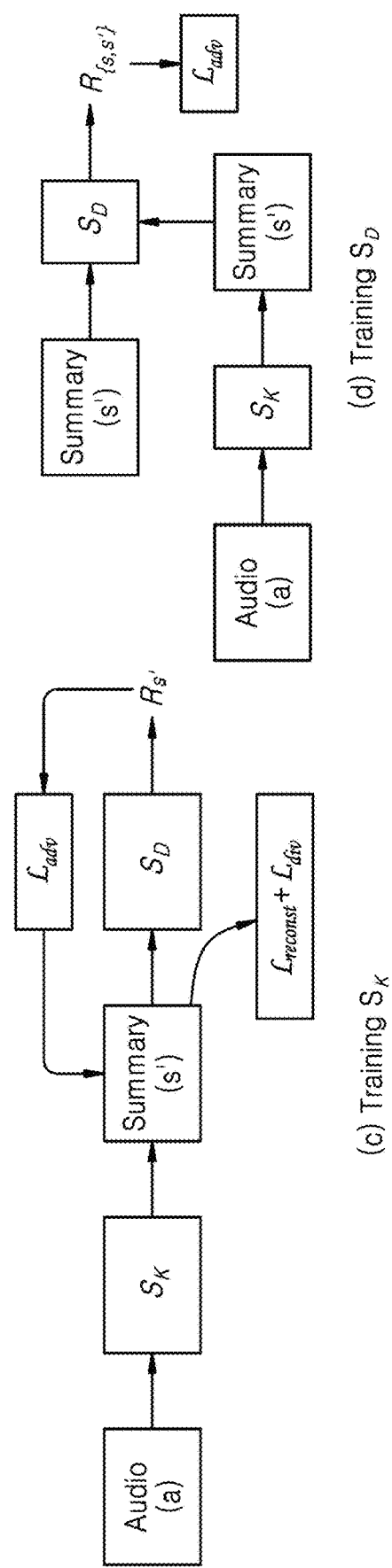

FIG. 18 illustrates a summary generator-discriminator network and corresponds to the operation 210 of FIG. 2. FIG. 18B illustrates a learning phase of the summary generator-discriminator network referred in FIG. 18A. The Learning objective aims at minimizing an adversarial loss, a reconstruction loss, and a diversity loss. Adversarial Loss aims to match the distribution of summary audio produced by the key frame selector network SK of FIG. 17 with the data distribution of real summary audios. Reconstruction Loss is used to minimize the difference between the reconstructed feature representations of the k key frames in the predicted summary audio SK(a) and the input frame-level representation of those k key frames in the input audio.

Figure 19:
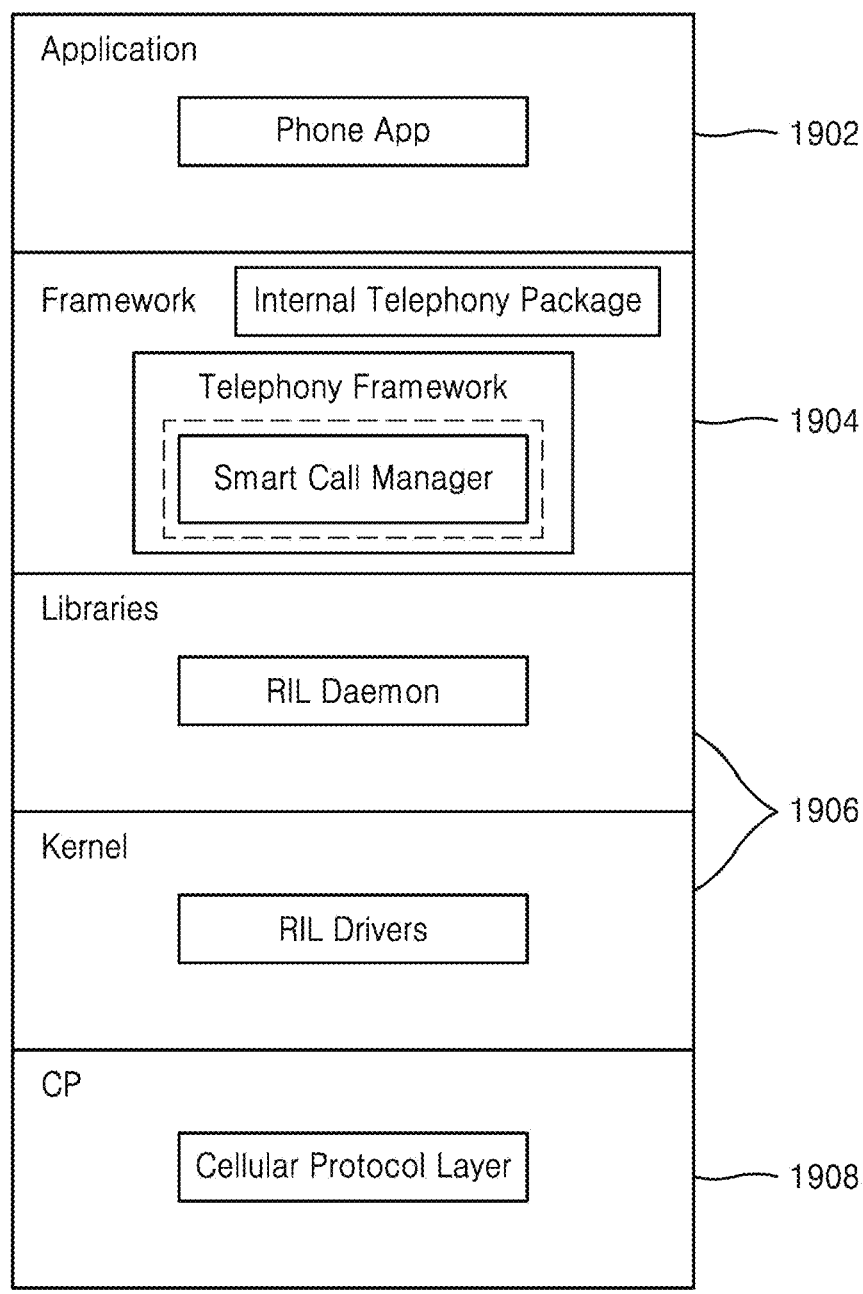
FIG. 19 illustrates an architecture to implement the method according to an embodiment.

FIG. 19 illustrates an architecture to implement the method FIGS. 1 and 2, according to an embodiment. According to an example embodiment, the architecture corresponds to a mobile device 1900. However, the disclosure is not limited to a mobile device, and as such, according to another example embodiment, the illustrated features of FIG. 19 may be included in other computing systems or devices having embedded systems. The various modules in the architecture are below. Herein, the term such as "unit" or "module" refers to an entity for processing at least one function or operation, and may be implemented by hardware, software, or a combination of hardware and software. For example, "units" or "modules" may be implemented by a processor, AN application-specific integrated circuit, field-programmable gate arrays, etc.

According to an embodiment, the architecture may include an Application 1902, a Framework 1904, a Radio Interface Layer (RIL) and a communication processor 1908. According to an embodiment, Application 1902 and/or Framework 1904 may be implemented by an Application Processor (AP). However, the disclosure is not limited thereto. The Application 1902 may include applications for basic functions of the device such as making a phone call, Contacts etc.

According to an embodiment, framework 1904 provides Telephony (Application Programming Interfaces) APIs to Application Layer which may include components such as Call, Network configuration and Smart Call Manager.

According to an embodiment, the Smart Call Manager may implement the method illustrated in FIGS. 1 and 2, and thereby enhances the quality of communication using AI and ML techniques for audio remediation. For example, the Smart Call Manager may implement the operations of generation 302, correction 304, conversion 306, coding 308 and deep listening 310 as illustrated in FIG. 3.

According to an embodiment, the RIL 1906 is an intermediate layer between the Application Processor and Communication Processor 1908, which will establish a communication between the processors. According to an embodiment, the RIL layer includes a library and a kernel. According to an embodiment, the library may include RIL daemon and the kernel may include RIL drivers. The drivers refer wireless module drivers.

According to an embodiment, the communication processor 1908 may include a cellular protocol layer. According to an embodiment, the communication processor 1908 may refer to a Modem, BP (BaseBand Processor) etc.

According to an embodiment, the Smart Call Manager remediates distorted, degraded voice electronically, even in a case such as vocal fold related diseases (like Spasmodic dysphonia), which cause voice deterioration that produce whispered speech, voice breaks, voice sound tight, strained, breathy or vocal tremor (voice to tremble).

According to an embodiment, the Smart Call Manager remediates degraded voice due to whispering which is normally done to make the conversation private such as night and speaker mode and corresponds to conversation in quiet environments like a library, a hospital, a meeting room, and for various forensic applications.

According to an embodiment, the Smart Call Manager remediates degraded voice due to voice problems in children and accordingly makes conversation unattractive. The degraded voice may also be to speech that is difficult to understand, since children tend to use only vowel sounds, and thus speech is produced that is unclear alongside dribbling and messy eating skills.

According to an embodiment, the Smart Call Manager remediates degraded voice due to mispronunciations by any speaker. The mispronunciations may create confusion among listeners and can reduce the communication quality greatly. Sometimes a mispronunciation may lead to unwanted twist in communications.

According to an embodiment, the Smart Call Manager remediates degraded voice when speaker or listener is moving during conversation away from mobile. Here, voice may change sometimes to whisper and back to normal or loud multiple times. It happens a lot in case of phone kept in one place (i.e., the phone maybe on charging/speaker) and user is moving in vicinity while talking.

According to an embodiment, the Smart Call Manager remediates degraded voice due to unintentional use of foul language on mobile when call listener is using the speaker in public places.

Figure 20:
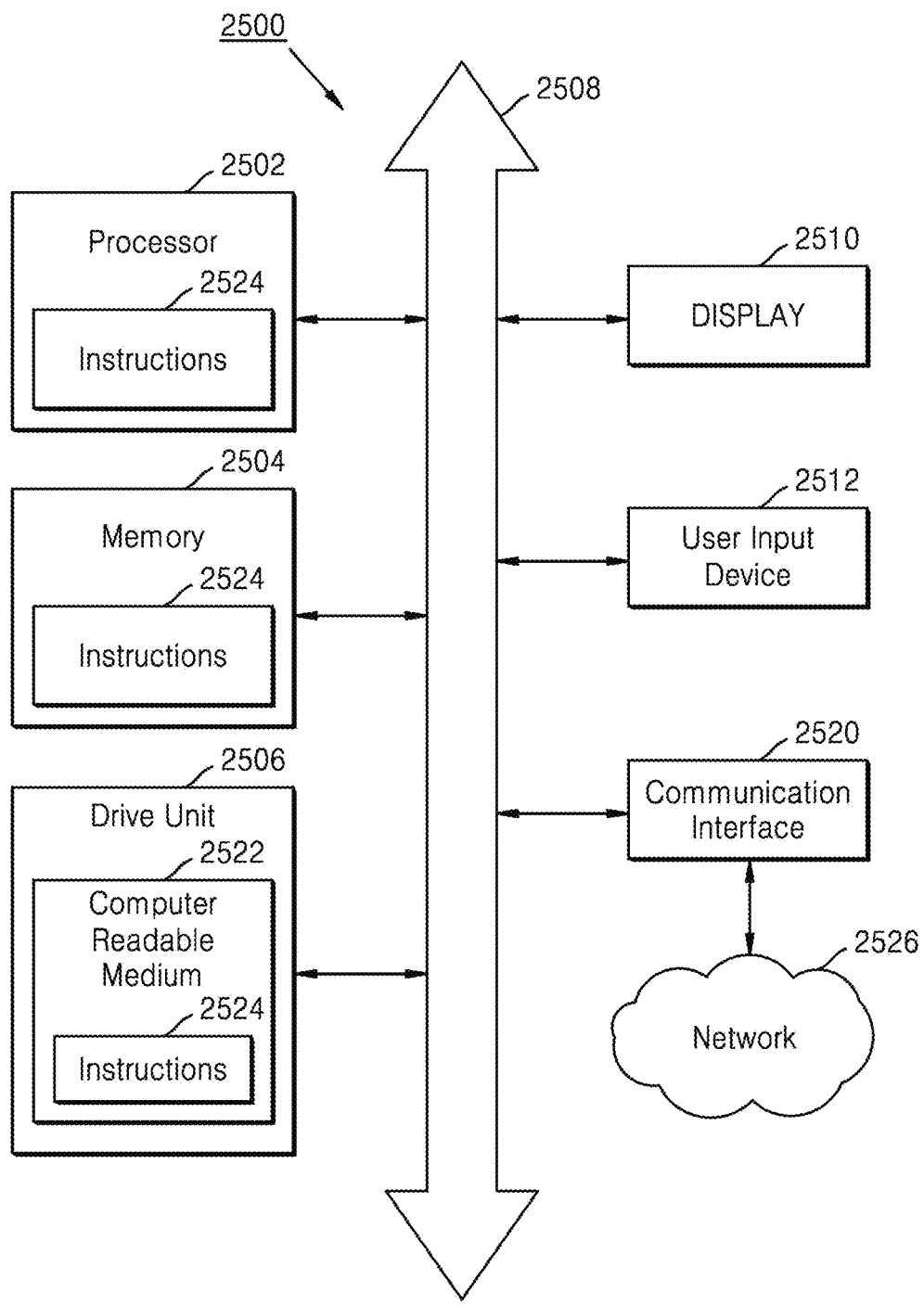
FIG. 20 illustrates an example implementation according to an embodiment.

According to an embodiment, the Smart Call Manager facilitates paraphrasing or summary generation. The same is necessary when the called user may not be listening properly due to distractions such as not paying attention on phone-call by looking around the room, watching TV, or glancing at their phone, in chat with another person in between etc. The present subject matter offers a voice panel wherein voice panel occurs on AI Trigger. The present subject matter addresses the same by providing various options on the voice panel such as repeating, paraphrasing and summarization FIG. 20 illustrates a computer system according to an embodiment. Here, a hardware configuration of mobile device 1900 illustrated through a computer system 2500. The computer system 2500 can include a set of instructions that can be executed to cause the computer system 2500 to perform any one or more of the methods disclosed. The computer system 2500 may operate as a standalone device or may be connected, e.g., using a network, to other computer systems or peripheral devices.

In a networked deployment, the computer system 2500 may operate in the capacity of a server or as a client user computer in a server-client user network environment, or as a peer computer system in a peer-to-peer (or distributed) network environment. The computer system 2500 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 2500 is illustrated, the term "system" shall also be taken to include any collection of systems or sub-systems that individually or jointly execute a set, or multiple sets, of instructions to perform one or more computer functions.

The computer system 2500 may include a processor 2502 e.g., a central processing unit (CPU), a graphics processing unit (GPU), or both. The processor 2502 may be a component in a variety of systems. For example, the processor 2502 may be part of a standard personal computer or a workstation. The processor 2502 may be one or more general processors, digital signal processors, application-specific integrated circuits, field-programmable gate arrays, servers, networks, digital circuits, analog circuits, combinations thereof, or other now known or later developed devices for analyzing and processing data. The processor 2502 may implement a software program, such as code generated manually (i.e., programmed).

The computer system 2500 may include a memory 2504, such as a memory 2504 that can communicate via a bus 2508. The memory 2504 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 2504 includes a cache or random access memory for the processor 2502. In alternative examples, the memory 2504 is separate from the processor 2502, such as a cache memory of a processor, the system memory, or other memory. The memory 2504 may be an external storage device or database for storing data. The memory 2504 is operable to store instructions executable by the processor 2502. The functions, acts or tasks illustrated in the figures or described may be performed by the programmed processor 2502 for executing the instructions stored in the memory 2504. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 2500 may or may not further include a display unit 2510, such as a liquid crystal display (LCD), an organic light-emitting diode (OLED), a flat panel display, a solid-state display, a cathode ray tube (CRT), a projector, a printer or other now known or later developed display device for outputting determined information. The display 2510 may act as an interface for the user to see the functioning of the processor 2502, or specifically as an interface with the software stored in the memory 2504 or a driver 2506.

Additionally, the computer system 2500 may include an input device 2512 configured to allow a user to interact with any of the components of system 2500. The computer system 2500 may also include a disk or optical driver 2506. The disk driver 2506 may include a computer-readable medium 2522 in which one or more sets of instructions 2524, e.g. software, can be embedded. Further, the instructions 2524 may embody one or more of the methods or logic as described. In a particular example, the instructions 2524 may reside completely, or at least partially, within the memory 2504 or within the processor 2502 during execution by the computer system 2500.

According to an embodiment, a computer-readable medium that includes instructions 2524 or receives and executes instructions 2524 responsive to a propagated signal so that a device connected to a network 2526 can communicate voice, video, audio, images, or any other data over the network 2526. Further, the instructions 2524 may be transmitted or received over the network 2526 via a communication port or interface 2520 or using a bus 2508. The communication port or interface 2520 may be a part of the processor 2502 or may be a separate component. The communication port 2520 may be created in software or maybe a physical connection in hardware. The communication port 2520 may be configured to connect with a network 2526, external media, the display 2510, or any other components in system 2500, or combinations thereof. The connection with the network 2526 may be a physical connection, such as a wired Ethernet connection or may be established wirelessly as discussed later. Likewise, the additional connections with other components of the system 2500 may be physical or may be established wirelessly. The network 2526 may alternatively be directly connected to the bus 2508.

The network 2526 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet-switched network transmissions (e.g., TCP/IP, UDP/IP, HTML, and HTTP) may be used.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to the problem and any component(s) that may cause any benefit, advantage, or solution to occur or become more pronounced are not to be construed as a critical, required, or essential feature or component of any or all the claims.

What is claimed is:

1. A method of generating voice in a call session, the method comprising:
   extracting a plurality of features from a voice input through an artificial neural network (ANN);
   identifying one or more lost audio frames within the voice input, wherein the one or more lost audio frames are lost due to at least one of vocal issues or network issues;
   predicting by the ANN, for each of the one or more lost audio frames, one or more features of the respective lost audio frame;
   superposing the predicted features upon the voice input to generate an updated voice input; and
   correcting the updated voice input by:
      obtaining a confidence score of the updated voice input;
      splitting the updated voice input into a plurality of phonemes based on the confidence score;
      identifying one or more non-aligned phonemes out of the plurality of phonemes based on comparing the plurality of phonemes with language vocabulary knowledge;
      generating a plurality of variant phonemes; and
      updating the identified one or more non-aligned phonemes through one or more of:
         replacing the identified one or more non-aligned phonemes with the plurality of variant phonemes;
         adding additional phonemes to supplement the identified one or more non-aligned phonemes; or
         deleting the identified one or more non-aligned phonemes.

2. The method of claim 1, wherein the predicting by the ANN comprises:
   operating a single-layer recurrent neural network for audio generation configured to predict raw audio samples.

3. The method of claim 2, wherein the single-layer recurrent neural network comprises an architecture defined by WaveRNN and a dual softmax layer.

4. The method of claim 1, further comprising:
   updating the identified one or more non-aligned phonemes through regenerating the updated voice input defined by one or more of:
      replacement of the identified one or more non-aligned phonemes with the variant phonemes;
      removal of the identified one or more non-aligned phonemes; or
      additional phonemes supplementing the identified one or more non-aligned phonemes.

5. The method of claim 1, further comprising converting the updated voice input defined by a whisper into a converted updated voice input defined by a normal voice-input based on:
   executing a time-alignment between whispered and a corresponding normal speech; and
   learning by a generator adversarial network (GAN) model cross-domain relations between the whisper and the normal speech.

6. The method of claim 1, further comprising:
   improving voice quality of the updated voice input based on a nonlinear activation function.

7. A system for generating voice in a call session, the system comprising:
   a microphone;
   a memory storing one or more instructions; and
      at least one processor configured to execute the one or more instructions to: extract a plurality of features from a voice input through an artificial neural network (ANN);
      identify one or more lost audio frames within the voice input, wherein the one or more lost audio frames are lost due to at least one of vocal issues or network issues;
      predict by the ANN the features of the one or more lost audio frames for each missing frame;
      superpose the predicted features upon the voice input to generate an updated voice input; and
      correct the updated voice input by:
         obtaining a confidence score of the updated voice input;
         splitting the updated voice input into a plurality of phonemes based on the confidence score;
         identifying one or more non-aligned phonemes out of the plurality of phonemes based on comparing the plurality of phonemes with language vocabulary knowledge;
         generating a plurality of variant phonemes; and
         updating the identified one or more non-aligned phonemes through one or more of:
            replacing the identified one or more non-aligned phonemes with the plurality of variant phonemes;
            adding additional phonemes to supplement the identified one or more non-aligned phonemes; or
            deleting the identified one or more non-aligned phonemes.

8. The system of claim 7, wherein the processor is further configured to execute the one or more instructions to by the ANN by operating a single-layer recurrent neural network for audio generation configured to predict raw audio samples.

9. The system of claim 8, wherein the single-layer recurrent neural network comprises an architecture defined by WaveRNN and a dual softmax layer.

10. The system of claim 7, the processor is further configured to:
  update the identified one or more non-aligned phonemes through regenerating the updated voice input defined by one or more of:
    replacement of the identified one or more non-aligned phonemes with the variant phonemes;
    removal of the identified one or more non-aligned phonemes; or
    additional phonemes supplementing the identified one or more non-aligned phonemes.

11. The system of claim 7, the processor is further configured to convert the updated voice input defined by a whisper into a converted updated voice input defined by a normal voice-input based on:
  executing a time-alignment between whispered and a corresponding normal speech; and
  learning by a generator adversarial network (GAN) model cross-domain relations between the whisper and the normal speech.

12. The system of claim 7, the processor is further configured to improve voice quality of the updated voice input based on a nonlinear activation function.

13. The system of claim 7, wherein the processor is further configured to:
  extract one or more frames from the updated voice input;
  encode a temporal information associated with the one or more frames through a convolution network;
  execute a deconvolution over the encoded information to obtain a prediction score;
  classify the extracted frames into key frames or non-key frames based on the prediction score; and
  present a summary based on the classified key frames.

14. The system of claim 13, the processor is configured to learn relation between raw audio frames (A) and a set of summary audios (S), wherein a distribution of resultant summary-audios F(A) is targeted to be similar to a distribution of the set of summary audios (S); and
  train a summary discriminator to differentiate between the generated summary audio F(A) and a real summary audio.

* * * * *